United States Patent
Soltani et al.

(10) Patent No.: US 12,136,052 B2
(45) Date of Patent: Nov. 5, 2024

(54) VERIFICATION OF PROGRESSION OF CONSTRUCTION-RELATED ACTIVITY AT GIVEN LOCATION

(71) Applicant: Procore Technologies, Inc., Carpinteria, CA (US)

(72) Inventors: Mohammad Mostafa Soltani, North York (CA); Dan Park, Eastvale, CA (US); Kevin McKee, Del Mar, CA (US); Matt Man, Thornhill (CA)

(73) Assignee: Procore Technologies, Inc., Carpinteria, CA (US)

( * ) Notice: Subject to any disclaimer, the term of this patent is extended or adjusted under 35 U.S.C. 154(b) by 247 days.

(21) Appl. No.: 17/895,556

(22) Filed: Aug. 25, 2022

(65) Prior Publication Data
US 2024/0070573 A1  Feb. 29, 2024

(51) Int. Cl.
*G06Q 10/00* (2023.01)
*G06Q 10/0631* (2023.01)
(Continued)

(52) U.S. Cl.
CPC ... *G06Q 10/06311* (2013.01); *G06Q 10/0633* (2013.01); *G06V 10/00* (2022.01); *G06Q 50/08* (2013.01)

(58) Field of Classification Search
CPC .......................... G06Q 10/0633; G06V 10/00
See application file for complete search history.

(56) References Cited

U.S. PATENT DOCUMENTS 10,853,934 B2  12/2020  Man et al.
11,222,475 B2   1/2022  McKee et al.
(Continued)

FOREIGN PATENT DOCUMENTS

JP  2010-157206 A     7/2010
JP  2019-019592 A     2/2019
JP  10-2020-0086974 A 7/2020

OTHER PUBLICATIONS

P. Ivson, D. Nascimento, W. Celes and S. D. Barbosa, "CasCADe: A Novel 4D Visualization System for Virtual Construction Planning," in IEEE Transactions on Visualization and Computer Graphics, vol. 24, No. 1, pp. 687-697, Jan. 2018, doi: 10.1109/TVCG. 2017.2745105. (Year: 2108).*
International Searching Authority, PCT International Search Report and Written Opinion, PCT International Application No. PCT/US2023/030944, Dec. 26, 2023, 9 pages.
(Continued)

*Primary Examiner* — Matheus Ribeiro Stivaletti
(74) *Attorney, Agent, or Firm* — Lee Sullivan Shea & Smith LLP

(57) ABSTRACT

A computing platform is configured to: (i) receive, from a first client station, (a) data related to the first client station and (b) a first image associated with a target location; (ii) based on the received data related to the first client station, determine a location signature associated with the first image; (iii) determine that the location signature associated with the first image has a threshold level of similarity to a location signature associated with a second image that is associated with the target location; (iv) evaluate at least the first image to determine progression of a construction-related activity at the target location; (v) based on the evaluation of at least the first image, determine that the construction-related activity at the target location has progressed a threshold amount; and (vi) transmit, to a second client station, a communication related to progression of the construction-related activity.

19 Claims, 10 Drawing Sheets

(51) Int. Cl.
  *G06Q 10/0633*   (2023.01)
  *G06Q 50/00*     (2024.01)
  *G06V 10/00*     (2022.01)
  *G06Q 50/08*        (2012.01)

(56) References Cited

U.S. PATENT DOCUMENTS

2019/0180433 A1   6/2019  Sasson et al.
2019/0325089 A1*  10/2019 Golparvar-Fard .... G06T 19/003
2021/0004591 A1*  1/2021  Bellaish ............... G06V 20/176
2022/0189159 A1   6/2022  Winterstein et al.
2024/0054576 A1*  2/2024  Henry ................... H04N 23/90

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

VERIFICATION OF PROGRESSION OF CONSTRUCTION-RELATED ACTIVITY AT GIVEN LOCATION

BACKGROUND

Construction projects are often complex endeavors involving the coordination of many professionals across several discrete phases. Typically, a construction project commences with a design phase, where architects design the overall shape and layout of a construction project, such as a building. Next, engineers engage in a planning phase where they take the architects' designs and produce engineering drawings and plans for the construction of the project. At this time, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

OVERVIEW

Construction projects may be complex endeavors during which numerous parties work to facilitate completion of the construction project. For instance, parties such as a general contractor (GC) and subcontractors may work to facilitate completion of the construction project. In general, a GC may be a business or an individual that is responsible for completing and/or overseeing all facets of the construction project, and a subcontractor may be a business or an individual that is awarded a contract by another party (e.g., a general contractor or another contractor) to perform a portion of the work on the construction project (e.g., one or more construction-related activities associated with the construction project).

One example challenge faced when parties contract or otherwise deal with other parties to perform one or more construction-related activities associated with construction projects is verifying that the one or more construction-related activities are complete. In practice, it may be desirable to have verification that the one or more construction-related activities are complete for a variety of reasons. For instance, it may be desirable for parties contracting with other parties to perform one or more construction-related activities to receive verification that construction-related activities are complete so as to, for instance, authorize payments for the construction-related activities (e.g., payments to subcontractors), update the construction schedule with actual completion percentage (e.g., by locations, costs codes, or phases, among other possibilities) and to assess the impact on what depending tasks can be moved forward or delayed, and/or monitor status of the construction-related activities during construction projects. It may also be desirable for parties contracted to perform the construction-activities to provide verification that construction-related activities are complete so as to, for instance, facilitate receiving payment for construction-related activities or updating other parties regarding status of the construction-related activities. It may also be difficult and/or not feasible for a general contractor to physically go to all the work fronts to inspect or check the progress of all the subcontractors' work at those work fronts. For instance, within examples, at times, more than 40 different subcontractors may work in 40 different locations daily on large construction jobs. Other examples are possible as well.

In an effort to alleviate some of these problems, a party (e.g., a subcontractor) performing a construction-related activity at a given location for another party (e.g., a general contractor) may provide the other party a "before image" and an "after image" of the construction-related activity at the given location, so as to provide verifiable proof that the construction-related activity at the given location is complete. This approach leverages the subcontractors who are already present in the work fronts doing the work. The subcontractor can also take pictures with minimum incremental effort and share them with the general contractor to prove work progression and completion. This approach may help ensure work completion is tracked in a scalable and distributed fashion without the GC deploying a person to take their own pictures or physically inspect all of the work fronts.

However, the existing before-and-after image approaches for verification of completion of the construction-related activity give rise to various problems. As one example, one or more of the images may not actually be reflective of the given construction-related activity at the given location. For instance, an "after image" provided as proof that a given construction-related activity at a given location is complete may be an image from a floor of a building different than the floor on which the given construction-related activity is to be performed, an image that was taken at a different time than the time the image was communicated or was purported to represent, or even an image from a different construction project or construction site. As another example, the existing before-and-after image approaches for verification of completion of the construction-related activity may involve an individual(s) reviewing the images to verify completion of the construction-related activity, which is a cumbersome, labor intensive, and time-consuming process, particularly in view of the large number of construction-related activities that are likely to be associated with a construction project. The existing before-and-after image approaches for verification of completion of the construction-related activity may give rise to other problems as well.

To help address the aforementioned and other problems, disclosed herein is new software technology for verification of progression of construction-related activity at a given location. In practice, the disclosed software technology could be implemented in a software as a service ("SaaS") application for construction management, such as the SaaS application offered by Procore Technologies, Inc., but it should be understood that the disclosed technology for verification of progression of construction-related activity at a given location may be incorporated into various other types of software applications as well (including software applications for verification of progression of a given activity in industries other than construction).

In accordance with the disclosed technology, a computing platform is configured to receive, from a first client station, (i) data related to the first client station and (ii) a first image associated with a target location, and determine, based on the received data related to the first client station, a location signature associated with the first image. The computing platform is further configured to determine that the location signature associated with the first image has a threshold level of similarity to a location signature associated with a second image that is associated with the target location. The computing platform is further configured to evaluate at least the first image to determine progression of a construction-related activity at the target location and, based on the evaluation of at least the first image, determine that the construction-related activity at the target location has progressed a threshold amount. The computing platform is further configured to, in response to (i) the determination that the location signature associated with the first image has the threshold level of similarity to the location signature associated with the second image and (ii) the determination that the construction-related activity at the target location has progressed the threshold amount, transmit, to a second client station, a communication related to progression of the construction-related activity and thereby cause an indication that the construction-related activity at the target location has progressed the threshold amount to be presented at a user interface of the second client station.

The software technology disclosed herein may provide various benefits over existing techniques for verification of progression of construction-related activity at a given location. For instance, by verifying that locations signatures of both the first and second image have a threshold level of similarity, the disclosed approach may help to ensure that the first and second images are reflective of the construction related activity at the given location. Further, as noted above, existing before-and-after image approaches for verification of completion of the construction-related activity may require users to expend a substantial amount of time and effort to verify completion of the construction-related activity. Advantageously, the disclosed approach for verification of progression of construction-related activity at a given location may help to significantly reduce this time and effort by evaluating at least the first image to determine progression of a construction-related activity at the target location and automatically determining, based on the evaluation of at least the first image, that the construction-related activity at the target location has progressed a threshold amount.

In accordance with the above, in one aspect, disclosed herein is a method that involves a computing platform: (i) receiving, from a first client station, (a) data related to the first client station and (b) a first image associated with a target location; (ii) based on the received data related to the first client station, determining a location signature associated with the first image; (iii) determining that the location signature associated with the first image has a threshold level of similarity to a location signature associated with a second image that is associated with the target location; (iv) evaluating at least the first image to determine progression of a construction-related activity at the target location; (v) based on the evaluation of at least the first image, determining that the construction-related activity at the target location has progressed a threshold amount; and (vi) in response to (a) the determination that the location signature associated with the first image has the threshold level of similarity to the location signature associated with the second image and (b) the determination that the construction-related activity at the target location has progressed the threshold amount, transmitting, to a second client station, a communication related to progression of the construction-related activity and thereby causing an indication that the construction-related activity at the target location has progressed the threshold amount to be presented at a user interface of the second client station.

In another aspect, disclosed herein is a computing system that includes at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable medium comprising program instructions that are executable to cause a computing platform to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, the present disclosure generally relates to technology for verification of progression of construction-related activity at a given location. In practice, the disclosed technology may be incorporated into a software as a service ("SaaS") application that facilitates construction management, which may include back-end software that runs on a back-end computing platform and front-end software that runs on users' client stations (e.g., in the form of a native application, a web application, and/or a hybrid application, etc.) and can be used to access the SaaS application via a data network, such as the Internet. For instance, as one possible example, the disclosed technology may be incorporated into a SaaS application for construction management, such as the one offered by Procore Technologies, Inc. However, other examples are possible as well.

I. EXAMPLE SYSTEM CONFIGURATION

Figure 1:
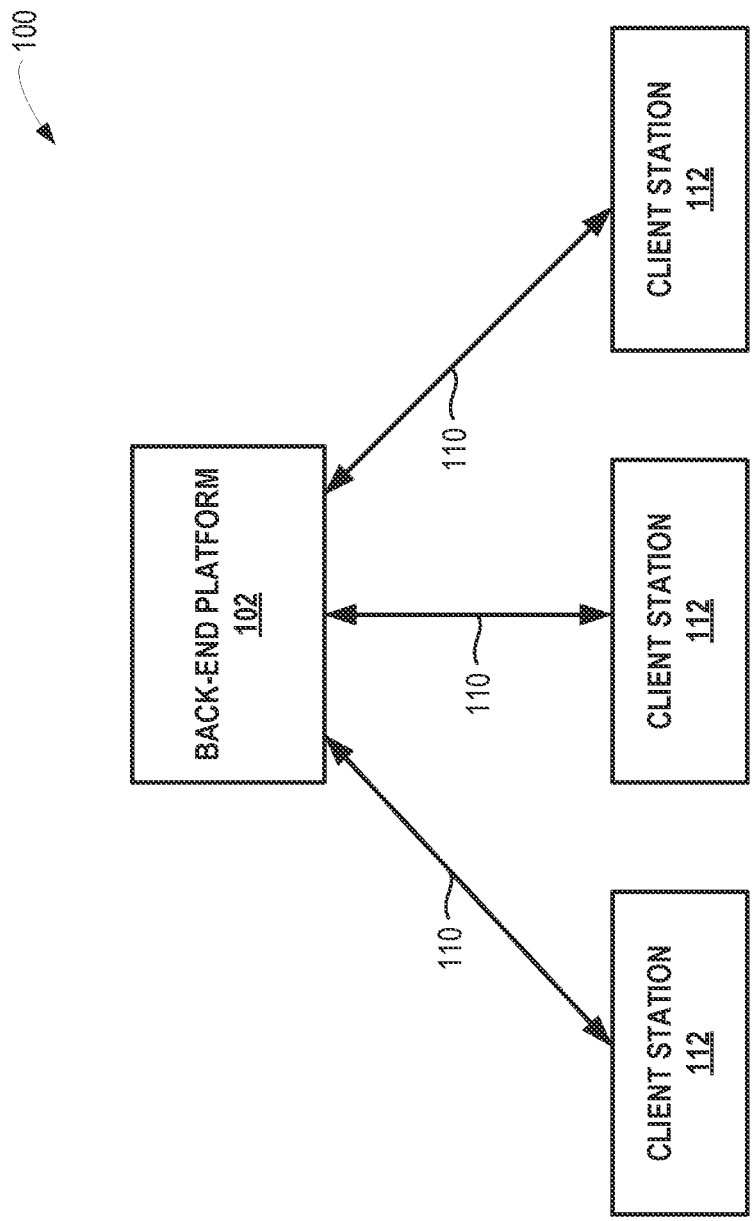
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been installed with back-end software (e.g., program code) for hosting an example SaaS application that incorporates the disclosed technology and delivering it to users over a data network. The one or more computing systems of back-end computing platform 102 may take various forms and be arranged in various manners.

For instance, as one possibility, back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like, which may be provisioned with software for carrying out one or more of the functions disclosed herein. As another possibility, back-end computing platform 102 may comprise "on-premises" computing resources of the organization that operates the example computing platform 102 (e.g., organization-owned servers), which may be provisioned with software for carrying out one or more of the functions disclosed herein. As yet another possibility, the example computing platform 102 may comprise a combination of cloud computing resources and on-premises computing resources. Other implementations of back-end computing platform 102 are possible as well.

In turn, client stations 112 may each be any computing device that is capable of accessing the SaaS application hosted by back-end computing platform 102. In this respect, client stations 112 may each include hardware components such as a processor, data storage, a communication interface, and user-interface components (or interfaces for connecting thereto), among other possible hardware components, as well as software components that facilitate the client station's ability to access the SaaS application hosted by back-end computing platform 102 and run the front-end software of the SaaS application (e.g., operating system software, web browser software, mobile applications, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

While FIG. 1 shows an arrangement in which three client stations are communicatively coupled to back-end computing platform 102, it should be understood that this is merely for purposes of illustration and that any number of client stations may communicate with back-end computing platform 102.

Although not shown in FIG. 1, back-end computing platform 102 may also be configured to interact with other third-party computing platforms, such as third-party computing platforms operated by organizations that have subscribed to the SaaS application and/or third-party computing platforms operated by organizations that provide back-end computing platform 102 with third-party data for use in the SaaS application. Such computing platforms, and the interaction between back-end computing platform 102 and such computing platforms, may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING PLATFORM

Figure 2:
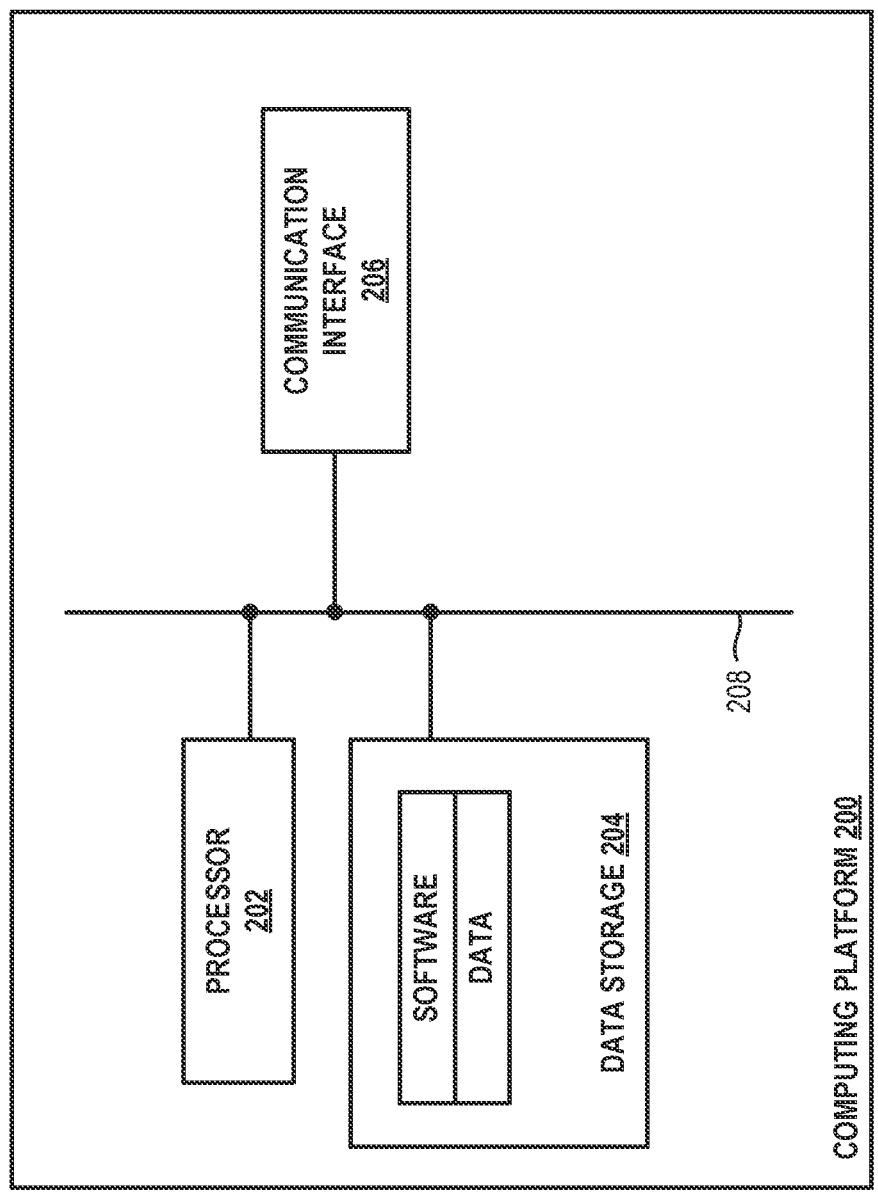
FIG. 2 depicts an example computing platform that may be configured to carry out one or more of the functions according to the disclosed technology.

FIG. 2 is a simplified block diagram illustrating some structural components that may be included in an example computing platform 200, which could serve as, for instance, back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the disclosed functions, which may be arranged together into engineering artifacts or the like, and (ii) data that may be received, derived, or otherwise stored by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, hard-disk drives, solid-state drives, flash memory, optical-storage devices, etc. Further, data storage 204 may utilize any of various types of data storage technologies to store data within the computing platform 200, examples of which may include relational databases, NoSQL databases (e.g., columnar databases, document databases, key-value databases, graph databases, etc.), file-based data stores (e.g., Hadoop Distributed File System or Amazon Elastic File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities. Further yet, in line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with client stations (e.g., one or more client stations 112 of FIG. 1) and/or third-party computing platform. Additionally, in an implementation where computing platform 200 comprises a plurality of physical computing systems connected via a network, communication interface 206 may be configured to facilitate wireless and/or wired communication between these physical computing systems (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate any of various types of wireless communication (e.g., WiFi communication, cellular communication, etc.), and/or any other interface that provides for wireless and/or wired communication. Communication interface 206 may also include multiple communication interfaces of different types. Other configurations are possible as well.

Although not shown, computing platform 200 may additionally include or have an interface for connecting to user-interface components that facilitate user interaction with computing platform 200, such as a keyboard, a mouse, a trackpad, a display screen, a touch-sensitive interface, a stylus, a virtual-reality headset, and/or speakers, among other possibilities.

It should be understood that computing platform 200 is one example of a computing system that may be used with the embodiments described herein. Numerous other arrangements are possible and contemplated herein. For instance, other computing systems may include additional components not pictured and/or more or fewer of the pictured components.

III. EXAMPLE CLIENT STATION

Figure 3:
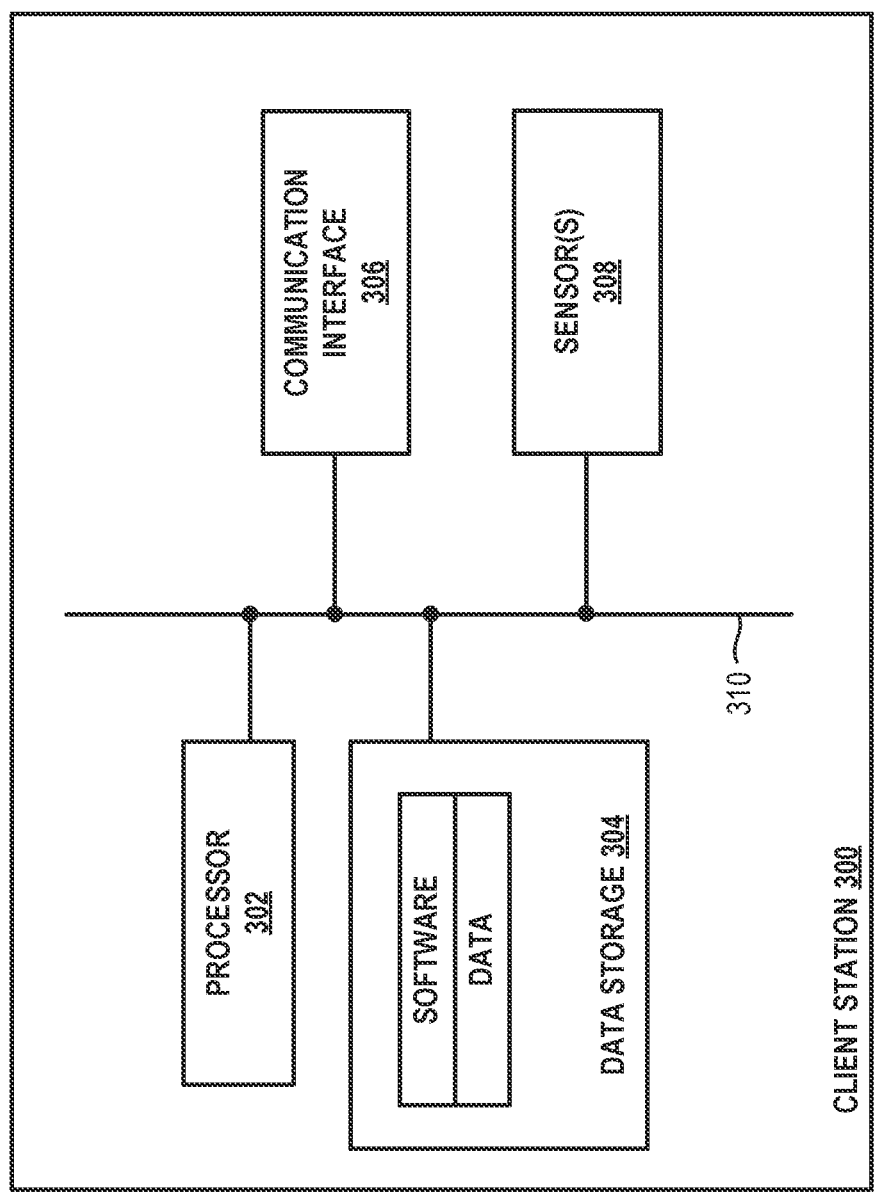
FIG. 3 depicts an example client station that may be configured to carry out one or more of the functions according to the disclosed technology.

FIG. 3 is a simplified block diagram illustrating some structural components that may be included in an example client station 300, which could serve as, for instance, a given client station 112 of FIG. 1. Client station 300 may generally comprise one or more computer systems (e.g., one or more servers), and these one or more computer systems may collectively include at least a processor 302, data storage 304, a communication interface 306, and one or more sensors 308, all of which may be communicatively linked by a communication link 310 that may take the form of a system bus, among other possibilities.

Processor 302 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 302 could comprise processing components that are distributed across a plurality of physical computing devices connected via a network, such as a computing cluster of a public, private, or hybrid cloud.

In turn, data storage 304 may comprise one or more non-transitory computer-readable storage mediums that are collectively configured to store (i) program instructions that are executable by processor 302 such that client station 300 is configured to perform some or all of the disclosed functions, which may be arranged together into engineering artifacts or the like, and (ii) data that may be received, derived, or otherwise stored by client station 300 in connection with the disclosed functions. In this respect, the one or more non-transitory computer-readable storage mediums of data storage 304 may take various forms, examples of which may include volatile storage mediums such as random-access memory, registers, cache, etc. and non-volatile storage mediums such as read-only memory, hard-disk drives, solid-state drives, flash memory, optical-storage devices, etc. Further, data storage 304 may utilize any of various types of data storage technologies to store data within the client station 300, examples of which may include relational databases, NoSQL databases (e.g., columnar databases, document databases, key-value databases, graph databases, etc.), file-based data stores (e.g., Hadoop Distributed File System or Amazon Elastic File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities. Further yet, in line with the discussion above, it should also be understood that data storage 304 may comprise computer-readable storage mediums that are distributed across a plurality of physical computing devices connected via a network, such as a storage cluster of a public, private, or hybrid cloud. Data storage 304 may take other forms and/or store data in other manners as well.

Communication interface 306 may be configured to facilitate wireless and/or wired communication with a back-end platform (e.g., back-end platform 102 of FIG. 1), other client stations (e.g., one or more other client stations 112 of FIG. 1) and/or third-party computing platform. Additionally, in an implementation where client station 300 comprises a plurality of physical computing systems connected via a network, communication interface 306 may be configured to facilitate wireless and/or wired communication between these physical computing systems (e.g., between computing and storage clusters in a cloud network). As such, communication interface 306 may take any suitable form for carrying out these functions, examples of which may include an Ethernet interface, a serial bus interface (e.g., Firewire, USB 2.0, etc.), a chipset and antenna adapted to facilitate any of various types of wireless communication (e.g., WiFi communication, cellular communication, etc.), and/or any other interface that provides for wireless and/or wired communication. Communication interface 306 may also include multiple communication interfaces of different types. Other configurations are possible as well.

The one or more sensor 308 of the client station 300 may include any suitable sensors such as the sensors discussed below, among other possibilities. In some examples, one or more sensors 308 include one or more sensors each configured to obtain data that may be utilized in determining location of client station 300.

Although not shown, client station 300 may additionally include or have an interface for connecting to user-interface components that facilitate user interaction with client station 300, such as a keyboard, a mouse, a trackpad, a display screen, a touch-sensitive interface, a stylus, a virtual-reality headset, and/or speakers, among other possibilities.

It should be understood that client station 300 is one example of a client station that may be used with the embodiments described herein. Numerous other arrangements are possible and contemplated herein. For instance, other client stations may include additional components not pictured and/or more or fewer of the pictured components.

IV. EXAMPLE OPERATIONS

As mentioned above, the present disclosure generally relates to technology for verifying progression of construction-related activity at a given location. As further mentioned above, the verification of progression of construction-related activity at a given location described herein can be carried out by a back-end computing platform, such as back-end computing platform 102 of FIG. 1, that is hosting a SaaS application comprising front-end software running on users' client stations and back-end software running on the back-end computing platform that is accessible to the client stations via a data network, such as the Internet. For instance, the disclosed technology is described below in the context of a SaaS application for construction management, such as the SaaS application offered by Procore Technologies, Inc., but it should be understood that the disclosed technology may be utilized to verify progression of an activity at a given location in various other contexts as well.
i. Verification of Progression of Construction-Related Activity As noted above, it may be desirable to verify progression of construction-related activity at a given location for various reasons, such as for authorizing payment for the construction-related activity, monitoring status of the construction-related activity, or updating one or more parties regarding status of the construction-related activity, among other possibilities. The disclosed technology facilitates verification of progression of construction-related activity at a given location.

Figure 4:
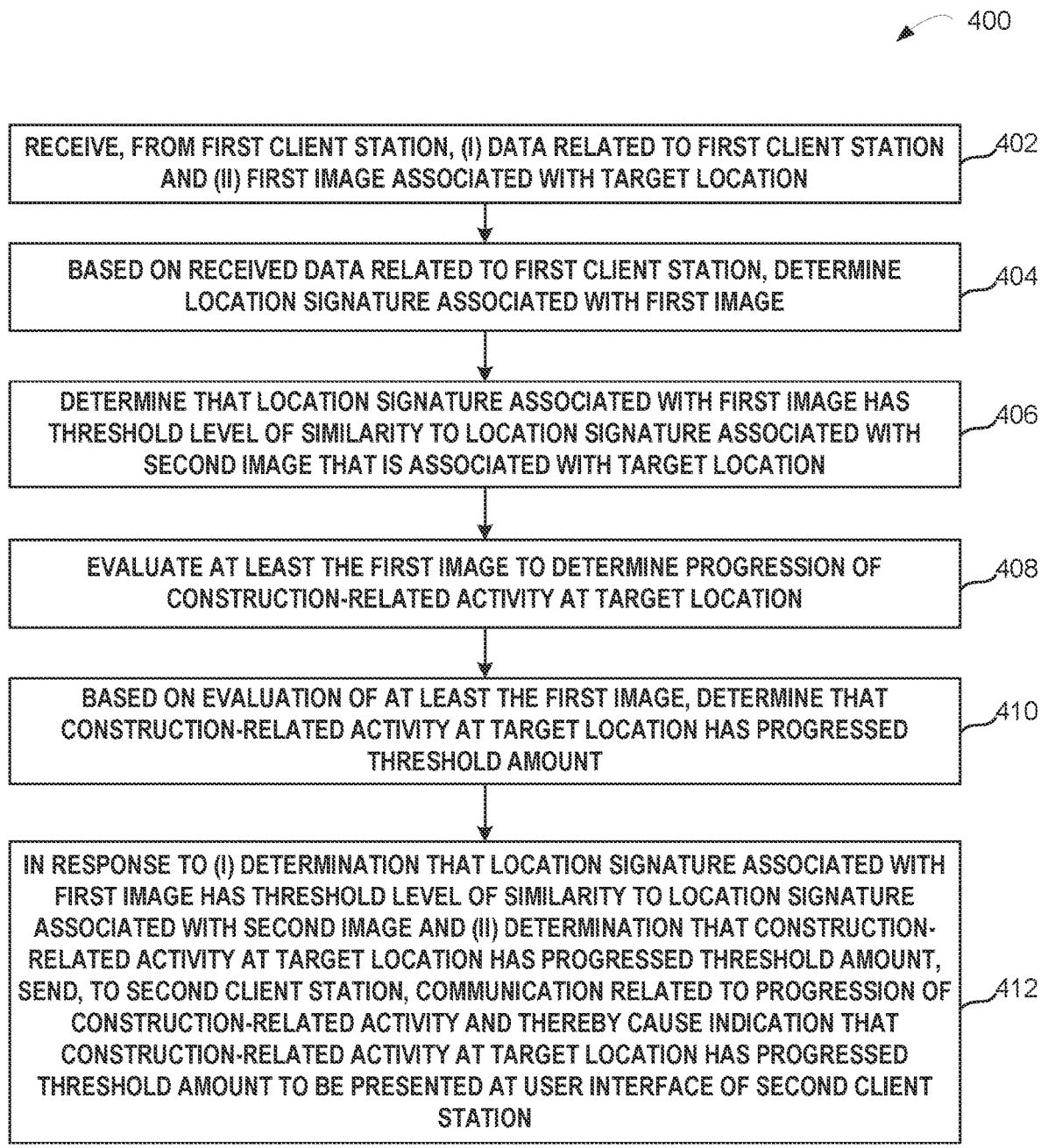
FIG. 4 depicts an example process for verifying progression of construction-related activity at a given location according to the disclosed technology.

FIG. 4 depicts one example of a process 400 that may be carried out in accordance with the disclosed technology in order to facilitate verification of progression of construction-related activity at a given location. For purposes of illustration only, example process 400 is described as being carried out by back-end computing platform 102 of FIG. 1, but it should be understood that example process 400 may be carried out by computing platforms that take other forms as well. Further, it should be understood that, in practice, the functions described with reference to FIG. 4 may be encoded in the form of program instructions that are executable by one or more processors of back-end computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

a. Receive (i) Data Related to Client Station and (ii) First Image Associated with Target Location The example process 400 may begin at block 402, where back-end computing platform 102 receives, from a first client station, (i) data related to the first client station and (ii) a first image associated with a target location. The first client station may be a client station such as one of client stations 112 of FIG. 1 and/or client station 300 of FIG. 3. Further, in an example, the first client station is a smartphone equipped with a camera configured to capture the first image associated with the target location.

In general, the data related to the first client station that is received by back-end computing platform 102 may be any data that may be utilized to identify a location of the first client station. In an example, the data related to the first client station may include one or more of location data of the first client station, sensor data of the first client station, and audio-visual data of the first client station, which in turn may be used to determine a location of the first client station.

Turning first to location data, the location data of the first client station may take any of various forms, including but not limited to one or more of ultra-wideband (UWB) data, short-range wireless technology data, Global Positioning System (GPS) data, Global System for Mobile Communications (GSM) data, WiFi data, and user-input location data.

Such location data may be used as a factor in determining location of the client station. For instance, regarding UWB data, when a client station (e.g., a smartphone) with UWB capability comes close to another UWB device, the two devices start ranging, or measuring, their distance. The ranging is accomplished through time-of-flight (ToF) measurements between the devices, which are used to calculate the roundtrip time of challenge/response packets. Such UWB data may be used as a factor in determining location of the client station. Further, regarding short-range wireless technology data, short-range wireless technology may help to find surrounding devices utilizing the same short-range wireless technology (e.g., Bluetooth technology) and the client station may collect data related to location of the client station relative to surrounding devices. Such short-range wireless technology data may be used as a factor in determining location of the client station. Still further, regarding GPS, a GPS receiver calculates and generates data regarding its own four-dimensional position in spacetime based on data received from multiple GPS satellites. Such GPS data may be used as a factor in determining location of the client station. Yet still further, regarding GSM data, GSM data is based on the client station's signal strength to nearby antenna masts. Such GSM data may be used as a factor in determining location of the client station. And yet still further, regarding WiFi data, a WiFi network (e.g., one or more WiFi access points) to which the client station is connected and/or within range of may provide additional data that can be used to determine location of the client station. Such WiFi data may be used as a factor in determining location of the client station. And yet still further, regarding user-input data, some interactions between a user and a client station can help localize the client station. For instance, a client station may present a map of user's surrounding area, and the user may enter a user-input location by dropping a pin on the map by tapping on the screen. Other examples of user-input data are possible as well. Such user-input data may be used as a factor in determining location of the client station.

Turning next to sensor data of the first client station, the sensor data of the first client station may take any of various forms, including but not limited to one or more of accelerometer data, gyroscope data, compass data, proximity-sensor data, barometer data, magnetometer data, and ambient-light-sensor data. Although such sensors may not be primarily designed for positioning a client station, data from such sensors can be utilized to help create a reliable location signature, as will be discussed in more detail herein. For example, a combination of one or more of accelerometer data, gyroscope data, and/or compass data may be used to determine accelerations and changes of direction (e.g., north/south) of the client station, which may provide a basis for determining the velocity and position of the client station over time, provided a starting location (e.g., a starting location based on the location data discussed above). Further, barometer data may provide an estimate of the elevation of the client device (e.g., elevation above sea level), which in turn may provide an indication of a floor of a building. Various other examples are also possible.

And turning next to audio-visual data of the first client station, the audio-visual data of the first client station may take any of various forms, including but not limited to one or more of camera data, microphone data, and light detection and ranging (LiDAR) scanner data. Although such audio-visual equipment may not be primarily designed for positioning a client station, data from such audio-visual equipment can be utilized to help create a reliable location signature, as will be discussed in more detail herein. For instance, sequential camera images and/or LiDAR scans may be used to estimate a distance the client station moved over a given period of time by implementing one or more visual odometry (VO) techniques. Other examples are also possible.

Further, in addition to receiving data that may be utilized to identify a location of the client station, back-end computing platform 102 may also receive data indicative of the date and time at which the first image was taken, orientation at which the first image was taken, and/or features of the first image (e.g., visual features and/or depth features), among other possibilities. Other data is possible as well.

In general, the first image received by back-end computing platform 102 may be an image that is taken at a target location at which construction-related activity is being performed. For instance, client station 112 may take a picture of the target location (e.g., in response to activation of the camera of client station 112, which may be based on user input to activate the camera and/or a determination that the client station 112 is located at the target location), and thereafter transmit the image to back-end computing platform 102.

The first image may be an image captured by the client station when the client station is located at the target location. An illustrative example of a first image associated with a target location is shown in FIG. 7A. In particular, FIG. 7A illustrates an example first image 700 that may be received by back-end computing platform 102 and from the first client station. First image 700 is an image of a room 704 at which a construction-related activity of building interior walls 706A-B is being performed. The interior walls 706A-B may, for instance, be intended to house or cover electrical conduit. As will be explained in greater detail below, this image may be analyzed by back-end computing platform 102 to determine progression of the construction-related activity at the target location.

b. Determination of Location Signature Associated with First Image

At block 404, back-end computing platform 102 determines, based on the received data related to the first client station, a location signature associated with the first image. In general, the location signature may be a signature of the first image that is (i) indicative of the location at which the first image was taken and (ii) based on data related to the first client station by which the image was taken. In this regard, a location signature may include various information including information indicative of the location at which the first image was taken and, optionally, other information related to the first image. Information indicative of the location at which the first image was taken may include, for instance, longitude, latitude, elevation, and/or floor, among other possibilities. Further, other information related to the first image may include, for instance, information indicative of the date and time at which the first image was taken, orientation at which the first image was taken, and/or features of the first image (e.g., visual features and/or depth features), among other possibilities. Other information is possible as well.

In practice, the amount of information included in the location signature may vary. In one example, the location signature may take the form of a single three-dimensional point in a global coordinate system. In another example, location signature may take the form of a signature having data populated into a plurality of different fields. For instance, in an example, signature may have data populated into two or more fields from a longitude field, a latitude field, an elevation field, a floor field, a floorplan-identification field, an orientation field, a direction field, a visual-features field, and a depth-features field, a time field, and/or a time-zone field. Other examples are possible as well.

Back-end computing platform 102 may carry out the function of determining the location signature associated with the first image based on the received data related to the first client station in various ways, and in at least some implementations, the computing platform may utilize one or more data analytics operations that each serve to analyze at least a portion of the received data related to the first client station and then determine a location estimate associated with the first image based on that analysis. In this respect, the data analytics operations carried out by back-end computing platform 102 may be embodied in any of various forms.

As one possibility, a data analytics operation may be embodied in the form of a user-defined rule (or set of rules) that is applied to at least a subset of the data related to the client station in order to derive location insights from that data related to the client station.

As another possibility, a data analytics operation may be embodied in the form of a data science model that is applied to at least a subset of the data related to the client station in order to derive location insights from that data related to the client station. In practice, such a data science model may comprise a machine learning model that has been created by applying one or more machine learning techniques to a set of training data, examples of which may include regression, random forest, support vector machines (SVM), artificial neural networks, Naïve Bayes, decision trees, dimensionality reduction, k-nearest neighbor (kNN), gradient boosting, clustering, and association, but data science models for performing data analytics operations could take other forms and be created in other manners as well. The data analytics operations carried out by the back-end computing platform 102 may be embodied in other forms as well.

Various data science models are possible and each of these data science models may be configured to receive different input data to output a location estimate based on the different input data. For instance, three example data science models that may be used to output location estimates based on various input data are shown in FIGS. 5A-C.

Figure 5A:
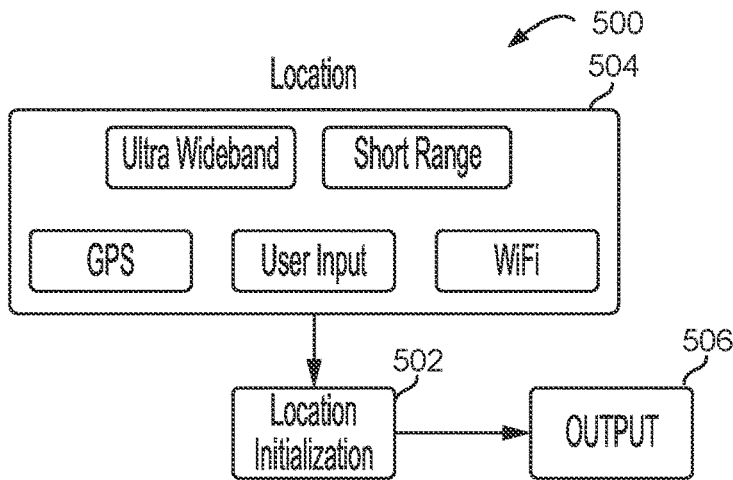
FIG. 5A depicts a conceptual illustration of an example data-analytics operation for determining a location signature associated with an image.
Figure 5B:
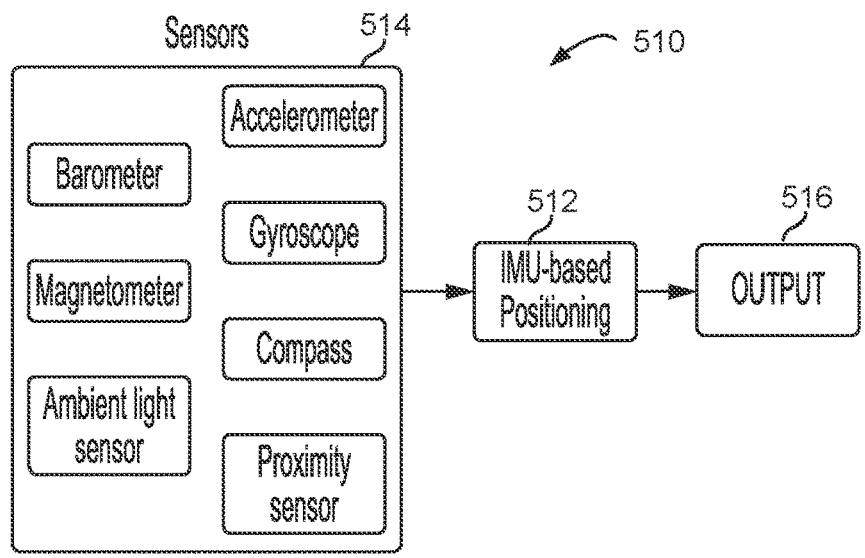
FIG. 5B depicts a conceptual illustration of an example data-analytics operation for determining a location signature associated with an image.
Figure 5C:
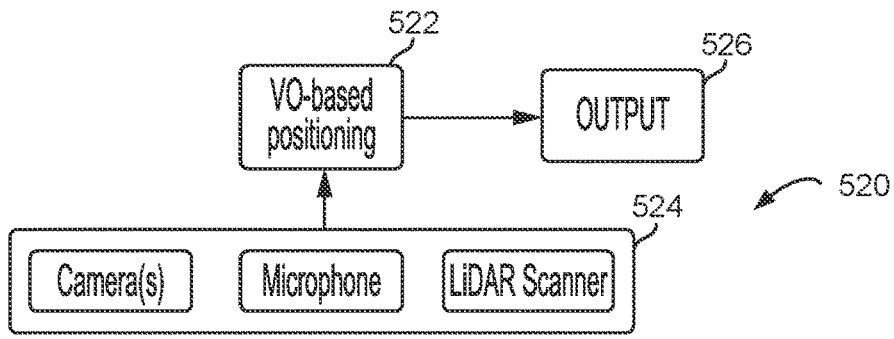
FIG. 5C depicts a conceptual illustration of an example data-analytics operation for determining a location signature associated with an image.

FIG. 5A depicts a conceptual illustration of an example data-analytics operation 500 for determining a location-initialization location estimate based on location data. Localization-initialization machine learning model 502 may be created by running a machine learning process based on training data, where the machine learning process applies one or more machine learning techniques such as the machine learning techniques discussed above. After creating localization-initialization machine learning model 502, back-end computing platform 102 may use the model to determine a location-initialization location estimate based on location data received from the first client station.

In the example of FIG. 5A, localization-initialization machine learning model 502 may be configured to receive at least a set of input data 504 related to the first client station. Input data 504 may be location data related to the first client station. As discussed above, the location data of the first client station may take any of various forms, including but not limited to one or more of UWB data, short-range wireless technology data, GPS data, GSM data, WiFi data, and user-input location data. Localization-initialization machine learning model 502 is configured to evaluate input data 504 and, based on the evaluation, determine an output 506 that takes the form of a location-initialization location estimate for the first client station.

In an example where the received data includes user input (e.g., a pin drop), localization-initialization machine learning model 502 may utilize the user input in various ways. As one possibility, localization-initialization machine learning model 502 may assign the user input a given weight for the analysis. As another possibility, localization-initialization machine learning model 502 may use the user input as a check or confirmation that the location estimate is correct. Other examples are possible as well.

Further, FIG. 5B depicts a conceptual illustration of an example data-analytics operation 510 for determining an Inertial Measurement Unit based (IMU-based) positioning location estimate based on sensor data. Within examples, an Inertial Measurement Unit (IMU) is an electronic device that measures and reports a body's specific force, angular rate, and/or the orientation of the body, using one or more sensors (e.g., accelerometer(s), gyroscope(s), compass(es), barometer(s), and/or magnetometer(s)). IMU-based positioning machine learning model 512 may be created by running a machine learning process based on training data, where the machine learning process applies one or more machine learning techniques such as the machine learning techniques discussed above. After creating IMU-based positioning machine learning model 512, back-end computing platform 102 may use the model to determine an IMU-based positioning location estimate based on sensor data received from the first client station.

In the example of FIG. 5B, IMU-based positioning machine learning model 512 may be configured to receive at least a set of input data 514 related to the first client station. Input data 514 may be sensor data related to the first client station. As discussed above, the sensor data of the first client station may take any of various forms, including but not limited to one or more of accelerometer data, gyroscope data, compass data, proximity-sensor data, barometer data, magnetometer data, and ambient-light-sensor data. IMU-based positioning machine learning model 512 is configured to evaluate input data 514 and, based on the evaluation, determine an output 516 that takes the form of an IMU-based positioning location estimate for the first client station.

Within examples, IMU-based positioning machine learning model 512 may leverage algorithms and neural networks to estimate the location trajectory of the client station based on sensor data from an IMU unit (e.g., gyroscope data and accelerometer data). For instance, using algorithms such as double integration or a Kalman filter, a location trajectory may be estimated in the form of location sample points XYZ in three-dimensional (3D) space. Further, a neural network(s) may be used to reduce the displacement error known as drift in the cartesian plane. In an example, such an approach may provide results within 1% error rate under 300 meters traveled.

Analysis of different sensor data may provide different information related to a location trajectory of the client station. For instance, analysis of accelerometer data may provide the distance traveled by the client station, whereas analysis of gyroscope data may provide all turns taken by the client station. In an example, at an example sensor sampling rate of 200 hertz (Hz) (200 times per second), a sensor-fused XY-vector, tangent to the gravity, with the non-compensated gyroscope and accelerometer, may be used to estimate the trajectory of the location samples as XYZ points in 3D space in nanosecond time scale. In some examples, these XYZ points are relative in space without a physical anchor location point. In some examples, a physical anchor point can be attributed in various ways, such as by a GPS signal or the user pin drop on a map, among other possibilities.

Still further, FIG. 5C depicts a conceptual illustration of an example data-analytics operation 520 for determining VO-based positioning location estimate based on audio-visual data. VO-based positioning machine learning model 522 may be created by running a machine learning process based on training data, where the machine learning process applies one or more machine learning techniques such as the machine learning techniques discussed above. After creating VO-based positioning machine learning model 522, back-end computing platform 102 may use the model to determine a VO-based positioning location estimate based on audio-visual data received from the first client station.

In the example of FIG. 5C, VO-based positioning machine learning model 522 may be configured to receive at least a set of input data 524 related to the first client station. Input data 524 may be audio-visual data related to the first client station. As discussed above, the audio-visual data of the first client station may take any of various forms, including but not limited to one or more of camera data, microphone data, and LiDAR scanner data. VO-based positioning machine learning model 522 is configured to evaluate input data 524 and, based on the evaluation, determine an output 526 that takes the form of a VO-based positioning location estimate for the first client station.

Within examples, VO-based positioning machine learning model 522 may leverage various algorithms and neural networks to estimate the location trajectory of the client station using only photos. For instance, using computer-vision algorithms, such as feature-based detection or the direct light intensity detection, and neural networks, a location trajectory may be estimated with only photos. In an example, input images may be taken from a monocular, a stereoscopic, a multi-camera or an omnidirectional camera configuration. Further, using the principle of multi-view geometry to triangulate the robust feature points matched in paired images and to project them into 3D space provides an estimated location trajectory.

Figure 6:
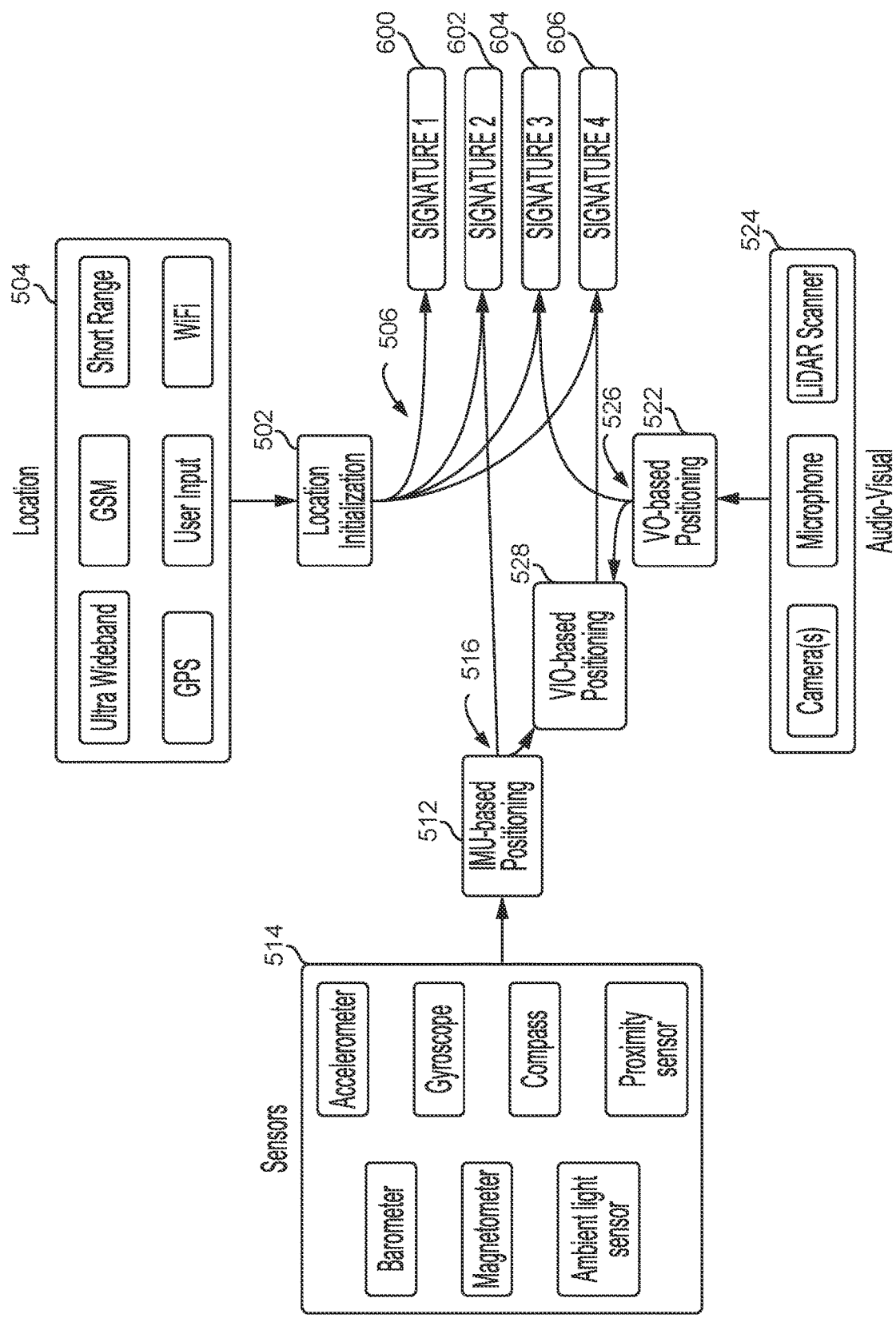
FIG. 6 depicts a conceptual illustration of example data-analytics operations for determining location signatures associated with an image.

Returning to block 404 of FIG. 4, within examples, back-end computing platform 102 may determine the location signature associated with the first image based on one or more of the location-initialization location estimate, the IMU-based positioning location estimate, and the VO-based positioning location estimate. In this regard, FIG. 6 illustrates a conceptual illustration of various examples for determining a location signature associated with an image based on the output of one or more of the machine learning models 502, 512, and 522. Determining a location signature associated with an image based on the output of one or more of the machine learning models 502, 512, and 522 may take various forms. As one possibility, back-end computing platform 102 may determine location signature 600 based on location-initialization location estimate 506. As another possibility, back-end computing platform 102 may determine location signature 602 based on location-initialization location estimate 506 and IMU-based positioning location estimate 516. As yet another possibility, back-end computing platform 102 may determine location signature 604 based on location-initialization location estimate 506 and VO-based positioning location estimate 526. As still yet another possibility, back-end computing platform 102 may determine location signature 606 based on location-initialization location estimate 506, VO-based positioning location estimate 526, and IMU-based positioning location estimate 516. In an example of determining location signature 606, back-end computing platform 102 may determine a Visual Inertial Odometry (VIO) based positioning location estimate 528 based on VO-based positioning location estimate 526 and IMU-based positioning location estimate 516, and back-end computing platform 102 may in turn determine location signature 606 based on location-initialization location estimate 506 and VIO-based positioning location estimate 528.

In practice, the locations signatures determined by back-end computing platform 102 may have different levels of granularity. For instance, determining a location signature based on location-initialization location estimate 506 may result in a location signature 600 having an example accuracy on the order of approximately +/−30 meters. Further, merging location-initialization with IMU-based positioning or VO-based positioning may improve the accuracy of the location signature. For instance, determining a location signature based on location-initialization location estimate 506 and IMU-based positioning location estimate 516 may result in a location signature 602 having an example accuracy on the order of approximately +/−15 meters. Similarly, determining a location signature based on location-initialization location estimate 506 and VO-based positioning location estimate 526 may result in a location signature 604 having an example accuracy on the order of approximately +/−15 meters. Still further, merging location-initialization with IMU-based positioning and VO-based positioning may further improve the accuracy of the location signature. For instance, determining a location signature based on location-initialization location estimate 506, IMU-based positioning location estimate 516, and VO-based positioning location estimate 526 may result in a location signature 606 having an example accuracy that may be less than +/−10 meters. In some examples, location signature 606 may have an example accuracy that is less than +/−1 meter. For instance, in some examples, location signature 606 may have an example accuracy between approximately 0.1 meters and 1 meter. For instance, location signature 606 may have an example accuracy of less than +/−0.8 meters, less than +/−0.6 meters, less than +/−0.4 meters, less than +/−0.2 meters, or less than +/−0.1 meters, among other possibilities.

It should be understood that these accuracies are intended as examples only and other accuracies are possible as well. In addition, as will be described in more detail below, the machine learning models may be retrained based on one or more determined errors, which may help to further improve the accuracy of the location signatures output by machine learning models 502, 512, and 522.

In some examples, the particular model(s) used by back-end computing platform 102 to determine the location signature associated with a given image may vary based on any of various factors, examples of which include the nature of the given construction-related activity (e.g., the location of construction-related activity, the type of construction-related activity, and/or whether the construction-related activity is indoor or outdoor, etc.), the type of data related to the client station received by the back-end computing platform, the preferences of the SaaS application provider, and/or the preferences of the user, among other possibilities. As a particular example, in practice, different construction activities may be associated with areas of different sizes, and back-end computing platform 102 may select which machine learning model(s) to use to derive the location signature based on the size of the area associated with the given construction-related activity. For instance, for construction activities associated with areas within a first size range (e.g., 100+ meters), back-end computing platform may determine the location signature using localization-initialization machine learning model 502, whereas for construction activities within a second size range (e.g., 10 meters or less), back-end computing platform may determine the location signature using localization-initialization machine learning model 502, IMU-based positioning machine learning model 512, and VO-based positioning machine learning model 522. Other examples are possible as well.

Although FIGS. 5A-C illustrate three different models 502, 512, and 522, it should be understood that in some examples, a single machine learning model may be configured to evaluate a combination of two or more of location data, sensor data, and/or audio-visual data and output a location estimate and/or location signature based on the evaluation.

As one possibility, a single machine learning model may be configured to receive input data 514 related to the first client station and input data 524 related to the first client station, evaluate both input data 514 and input data 524, and then output a location estimate and/or location signature that is based on audio-visual data and sensor data. For instance, in an example, the single machine learning model may be configured to evaluate both input data 514 and input data 524 and, based on the evaluation, determine an output that takes the form of a VIO-based positioning location estimate for the first client station. Such a single machine learning model may be a VIO-based positioning machine learning model. In an example where back-end computing platform 102 utilizes a VIO-based positioning machine learning model, rather than VIO-based positioning location estimate 528 being determined based on VO-based positioning location estimate 526 and IMU-based positioning location estimate 516 (e.g., as illustrated in FIG. 6), a VIO-based positioning machine learning model may be configured to determine VIO-based positioning location estimate 528. Further, in such an example, back-end computing platform 102 may determine the location signature associated with the first image based on the VIO-based positioning location estimate (perhaps in conjunction with the location-initialization location estimate).

In some examples, VIO algorithms may be able to estimate a trajectory estimate at a lower error rate than error rates of trajectory estimates that are solely IMU-based. In this regard, using a depth sensor (e.g., such as a LiDAR sensor) may augment the location-trajectory estimation by providing both the depth map of the scanned area and its scale measurement. A VIO-based positioning machine learning model may leverage various algorithms and neural networks to estimate the location trajectory. In an example, VIO-based positioning machine learning model may use algorithms, such as double integration, a Kalman filter, and/or computer vision algorithms and neural networks to estimate the location trajectory estimates with less error rate (e.g., compared to IMU-based trajectory estimates). In an example, drift error may be cleared or substantially cleared with the application of pose graph optimization.

As another possibility, a single machine learning model may be configured to evaluate input data 504 and 514, and then output a location estimate and/or location signature that is based on location data and sensor data.

As yet another possibility, a single machine learning model may be configured to evaluate input data 504 and 524, and then output a location estimate and/or location signature that is based on location data and audio-visual data.

As still yet another possibility, a single machine learning model may be configured to evaluate input data 504, 514, and 524, and then output a location estimate and/or location signature that is based on location data, sensor data, and audio-visual data. Other examples are possible as well.

As an illustrative scenario in which location data is supplemented with other data to facilitate determination of the location signature, a subcontractor may be performing a given construction-related activity (e.g., building an interior wall) at a given location (e.g., at a given floor of a building). Upon completion of the given construction-related activity, a representative of the subcontractor may travel to the site of the construction-related activity in order to take a photograph of the completed construction-related activity to facilitate verification of the completion of the activity, so as to receive payment for the activity. The representative may use a client station (e.g., a camera-equipped phone) to capture the photograph.

As the representative is approaching the building with the client station, the client station may obtain location data (e.g., a GPS signal). The GPS receiver may be configured to calculate its four-dimensional position in spacetime based on data received from GPS satellites. However, the GPS receiver relies on line of sight with the GPS satellites, so an indoor environment typically presents challenges for GPS. Therefore, in practice, upon entering the building, the GPS signal may be lost. In order to track the location of the client station inside the building, sensor data (e.g., accelerometer, gyroscope, compass, barometer data, etc.) may be added to the initial path of the client station outside the building. This sensor data may take the form of a stream of sensor data (e.g., a time-series of sensor data collected by the client station as a user of the client station moves that client station toward the target location). Back-end computing platform 102 may evaluate this stream of sensor data to facilitate determination of a location signature for the client station. Further, when the representative reaches the target location, the representative may take a photograph, and client station 112 may then send the image to the back-end computing platform. Based on the received data (e.g., the location data and the sensor data), back-end computing platform may determine the location signature of the image (i.e., the location of the client station at the time the image was captured by the client station).

In the examples above, back-end computing platform 102 determines a location signature of the first image based on an analysis of the data related to the first client station that the first client station sends to back-end platform 102. However, in other examples, the first client station may be configured to determine a client-station-determined location signature associated with the first image. In such examples, the data related to the first client station that the first client station sends to back-end platform 102 may be or include the client-station-determined location signature. Further, in some examples, the function of, based on the received data related to the first client station, determining a location signature associated with the first image may take the form of treating the received client-station determined location signature as the location signature associated with the first image.

c. Determination of Threshold Level of Similarity to Location Signature Associated with Second Image Returning to FIG. 4, after determining the location signature associated with the first image, at block 406, back-end computing platform 102 determines that the location signature associated with the first image has a threshold level of similarity to a location signature associated with a second image that is associated with the target location. The second image that is associated with the target location may be an image that was previously received by the back-end computing platform 102. In this regard, the second image is captured at a time prior to a time at which the first image is captured. Further, similar to the first image, the second image may have an associated location signature. In some examples, the location signature of the second image may be determined in various ways, including but not limited to any of the ways described above with respect to block 404 (i.e., determination of the location signature of the first image).

Figure 7B:
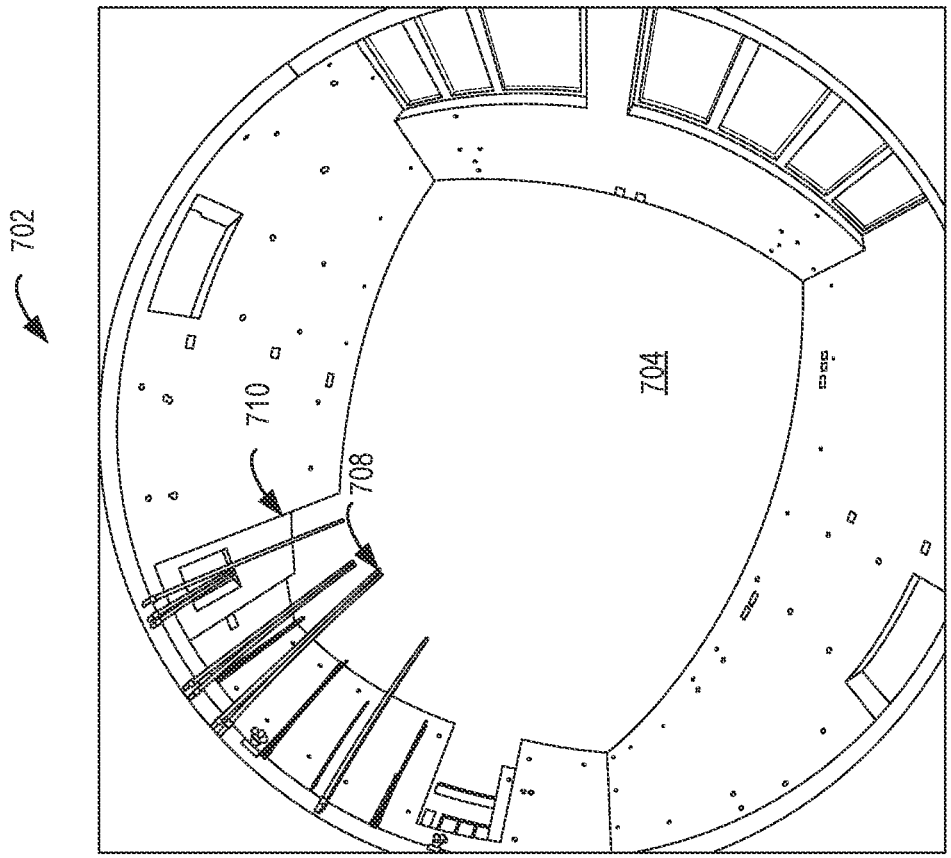
FIGS. 7A-B depict example images of construction-related activity at a given location according to the disclosed technology.
Figure 7A:
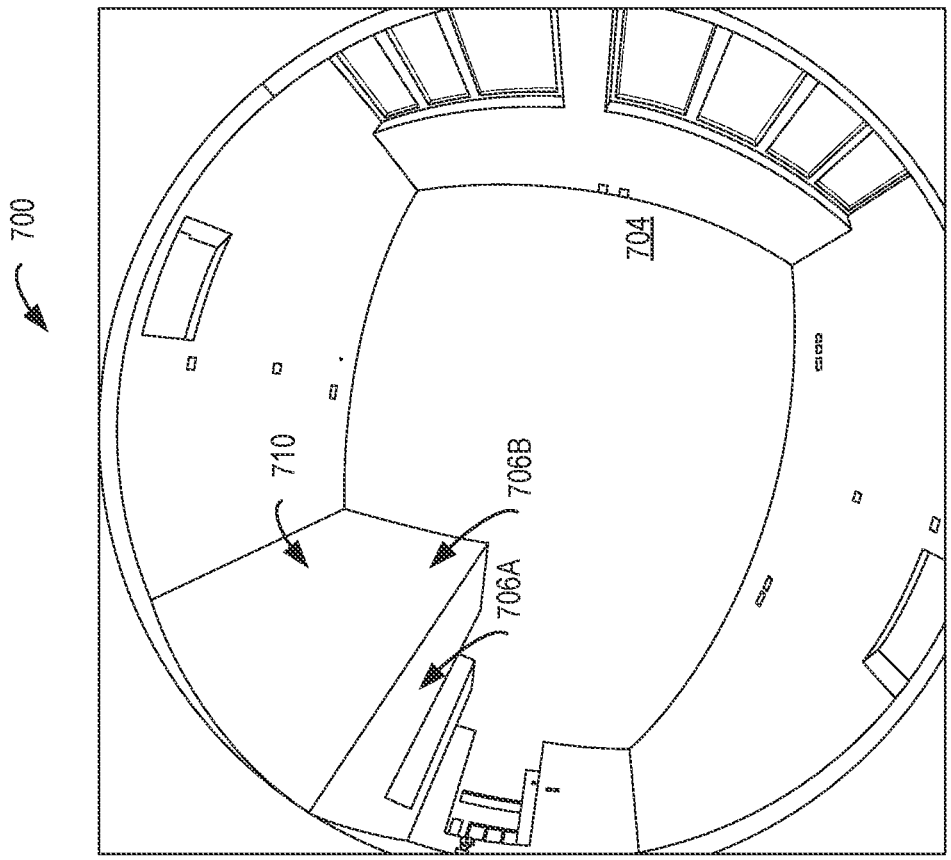

An illustrative example of a second image is shown in FIG. 7B. In particular, FIG. 7B illustrates an example second image 702 that may be received by back-end computing platform 102. Second image 702 is an image of room 704 prior to completion of the building interior walls 706A-B. As seen in FIG. 7B, second image 702 depicts electrical conduit 708 that interior walls 706A-B are intended to house or cover.

In some examples, the client station that captures the second image and thereafter sends the second image to back-end computing platform 102 may be the same client station as the client station that captures the first image and thereafter sends the first image to back-end computing platform 102. For instance, a given representative of a subcontractor may be responsible for taking a "before image" and an "after image" of the construction-related activity, and the representative may use the same client station to capture both the "before image" and the "after image." However, in other examples, the client station that captures the second image and thereafter sends the second image to back-end computing platform 102 may be different from the client station that captures the first image and thereafter sends the first image to back-end computing platform 102. For instance, in an example, a given representative of a subcontractor may be responsible for taking a "before image" and an "after image" of the construction-related activity, and the representative may use a different client station to capture the "before image" and the "after image." In another example, a first representative of the subcontractor may be responsible for taking a "before image" of the construction-related activity and a second representative of the subcontractor may be responsible for taking the "after image" of the construction-related activity, and these representatives may use different client stations to capture the images. Other examples are possible as well.

Returning to block 406 of FIG. 4, in general, back-end computing platform 102 may evaluate the location signature of the first image and the location signature of the second image, so as to determine whether the location signatures have a threshold level of similarity. The function of determining whether the location signatures have a threshold level of similarity may take various forms, and in at least some implementations, back-end computing platform 102 may utilize one or more data analytics operations that serve to analyze the location signature of the first image compared to the location signature of the second image. Such a data analytics operation may take various forms, including, for instance, the form of a data science model or the form of a user-defined set of rules, among other possibilities.

In an example, a primary implementation to determine whether the location signatures have a threshold level of similarity may involve a user-defined set of rules that take into account one or more factors, such as longitude, latitude, elevation, floor, orientation at which the image was taken, and/or features of the image (e.g., visual features and/or depth features), among other possibilities. For instance, a user-defined set of rules may treat location signatures as having a threshold level of similarity if the location signatures have latitudes within a threshold amount (e.g., within 5% of one another), longitudes within a threshold amount (e.g., within 5% of one another), and elevations within a threshold amount (e.g., within 5% of one another). In another example, a user-defined set of rules may treat location signatures as having a threshold level of similarity if the location signatures have latitudes within a threshold amount (e.g., within 5% of one another), longitudes within a threshold amount (e.g., within 5% of one another), and the same floor. Other examples are possible as well.

d. Determination of Progression of Construction-Related Activity at Target Location Returning to FIG. 4, at block 408, back-end computing platform 102 evaluates at least the first image to determine progression of a construction-related activity at the target location. Back-end computing platform 102 may evaluate at least first image to determine progression of the construction-related activity at the target location in any suitable way. In some examples, in addition to evaluating the first image, back-end computing platform 102 may also evaluate the second image (e.g., by comparing the first image to the second image) to determine progression of a construction-related activity at the target location.

The function of evaluating at least the first image to determine progression of a construction-related activity at the target location may take various forms, and in at least some implementations, back-end computing platform 102 may utilize one or more image-recognition operations that serve to identify objects in the first image and the second image, and determine progression of the construction-related activity based on the identified objects in the first and second images.

Different construction activities may be associated with different objects, and back-end computing platform 102 may analyze images to identify objects that are associated with the construction-related activity to which the image is associated. For instance, in an example, images associated with a first activity may be analyzed to identify objects in a first set of objects, whereas images associated with a second activity may be analyzed to identify a second set of objects. As an illustrative example, for construction-related activity of a concrete pour, back-end computing platform 102 may analyze images to identify prepared subgrade, framing, reinforcing bar (rebar), and a poured slab, whereas for construction-related activity of a construction of an inner wall, back-end computing platform 102 may analyze images to identify exterior walls, open space within exterior walls, framing, and drywall. Other examples are possible as well.

In one example implementation, back-end computing platform 102 may utilize a patch-based scene segmentation method to determine progression of a construction-related activity at the target location, such as the patch-based scene segmentation method described in U.S. Pat. No. 10,853,934, which is incorporated by reference herein in its entirety.

As an illustrative example of evaluating at least the first image to determine progression of the construction-related activity at the target location, with reference to FIGS. 7A-B, back-end computing platform 102 may evaluate first image 700 and second image 702, taken at an earlier point in time, to determine progression of the building of interior walls 706A-B. Analysis of the "before" image 702 may result in identification of electrical conduits 708 in a given area 710 of room 704. Further, analysis of the first image 700 (i.e., the "after" image) may result in identification of interior walls 706A-B in area 710. The evaluation may reveal that the construction-related activity of building the interior walls is complete. Other examples are possible as well.

e. Determination that the Construction-Related Activity Progressed Threshold Amount Returning to FIG. 4, at block 410, back-end computing platform 102 determines, based on the evaluation of at least the first image, that the construction-related activity at the target location has progressed a threshold amount.

The threshold amount may be any suitable threshold amount. As one possibility, the threshold amount comprises a predefined percentage of completion of the construction-related activity at the target location. The predefined percentage may be any suitable predefined percentage, including but not limited to 25%, 50%, 75%, and/or 100% complete, among other possibilities. As another possibility, a given construction-related activity may comprise a given number of predefined stages, and the threshold amount may be defined based on the predefined stages. For instance, in an example, the threshold amount may be defined as completion of a given stage from among the predefined stages. As yet another possibility, the construction-related activity at the target location may include a plurality of different construction-related tasks, and the threshold amount may be defined based on the plurality of tasks. For instance, in an example, the threshold amount may be defined as completion of a given number of the plurality of tasks. Other example threshold amounts are possible as well.

An illustrative example in which the threshold amount comprises a predefined percentage of completion of the construction-related activity at the target location is described with respect to FIGS. 7A-B. For instance, in an example, the threshold amount for the construction-related activity of building the interior walls may be 100%. Further, based on the analysis of first image 700 and second image 702, back-end computing platform 102 may determine that building of the interior walls has progressed the threshold amount of 100%. Other examples are possible as well.

f. Communication Related to Progression of the Construction-Related Activity

Returning to FIG. 4, at block 412, back-end computing platform 102, in response to (i) the determination that the location signature associated with the first image has the threshold level of similarity to the location signature associated with the second image and (ii) the determination that the construction-related activity at the target location has progressed the threshold amount, sends, to a second client station, a communication related to progression of the construction-related activity and thereby causes an indication that the construction-related activity at the target location has progressed the threshold amount to be presented at a user interface of the second client station.

In some examples, the second client station to which the communication related to progression of the construction-related activity is sent is different than the first client station from which the first image is received. For instance, in an example, the first client station may be associated with a first entity (e.g., a subcontractor) that is assigned to perform the given construction-related activity at the target location, and the second client station may be associated with a second entity (e.g., a general contractor) responsible for payment to the first entity for the given construction-related activity at the target location. Other examples are possible as well.

Figure 8:
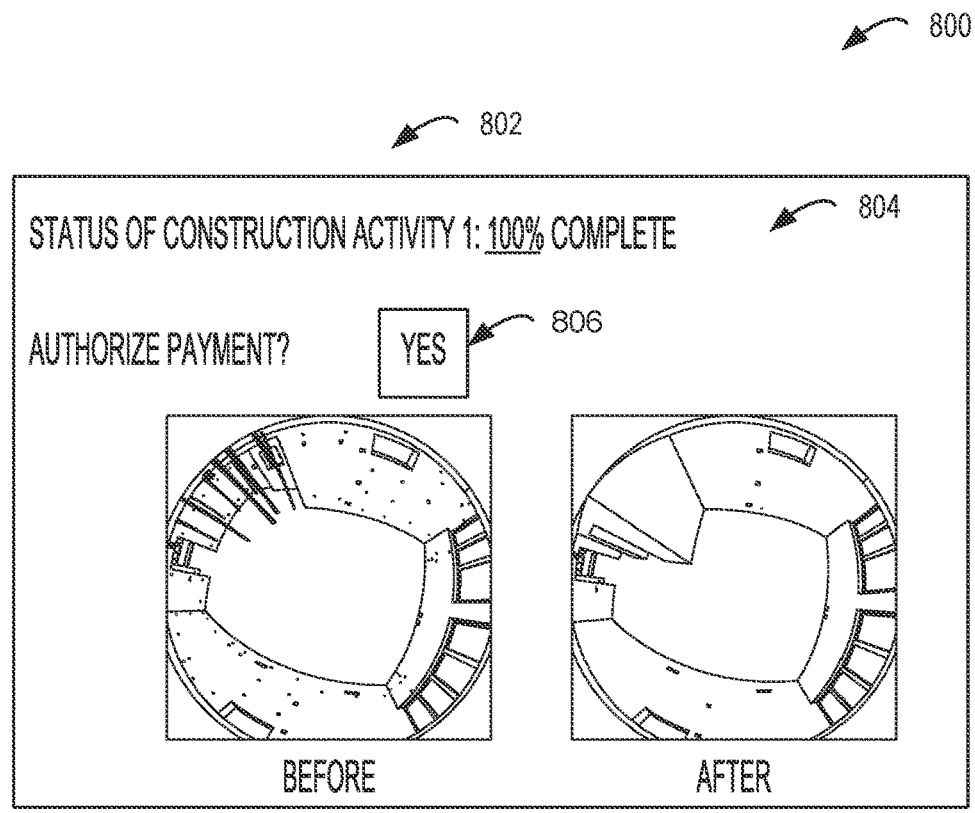
FIG. 8 depicts an example snapshot of a GUI that may be presented to a user according to the disclosed technology.

In general, the indication presented at the user interface of the second client station may include information suitable to serve to indicate a status of progression of the construction-related activity at the target location, and the indication may take various forms, one example of which is shown in FIG. 8. In particular, FIG. 8 depicts an example snapshot 800 of a GUI 802 that displays an indication 804 that the construction-related activity at the target location has progressed the threshold amount. In this example, the indication 804 comprises a textual indicator that a given construction-related activity (which in the example of FIG. 8 is represented as "Construction Activity 1") is 100% complete.

The indication that the construction-related activity at the target location has progressed the threshold amount may take other forms as well. For instance, in an example, back-end computing platform 102 may generate and send an email to a representative associated with the construction-related activity (e.g., a representative of the general contractor) and the indication may be presented at the user interface of the second client station when the email is viewed by a user of the second client station. As other possibilities, back-end computing platform 102 may initiate the sending of another type of communication, such as an autogenerated text message or phone call. Other examples are possible as well.

Further, in some cases, the communication related to progression of the construction-related activity at the target location may also cause a GUI element to be presented at the user interface of the second client station that may be activated by the user to authorize payment for the completed construction related activity (e.g., payment for the completed activity or payment for completion of a given phase of the construction-related activity). For instance, GUI 802 of FIG. 8 includes a GUI element 806 which may be activated to authorize payment for "Construction Activity 1." Other examples are possible as well. Further, in an example, the communication related to progression of the construction-related activity at the target location may also include one or more of the images. For instance, GUI 802 may also include both the before image and the after image of the construction-related activity at the target location.

Beneficially, by determining that (i) the location signature associated with the first image has the threshold level of similarity to the location signature associated with the second image and (ii) the construction-related activity at the target location has progressed the threshold amount, back-end computing platform 102 may serve to verify with both image-based and location-based evidence that the construction-related activity at the target location has progressed the threshold amount. In practice, it may be desirable to have such verification for a variety of reasons including, for instance, authorizing payment for the construction-related activity or monitoring status of the construction-related activity during a construction project (perhaps along with monitoring a plurality of other construction related activities during the construction-related project).

In some examples, in addition or alternative to sending to the second client station the communication discussed above in response to (i) the determination that the location signature associated with the first image has the threshold level of similarity to the location signature associated with the second image and (ii) the determination that the construction-related activity at the target location has progressed the threshold amount, back-end computing platform 102 may take another action in response to those determinations. For instance, in an example, back-end computing platform 102 may, in response to (i) the determination that the location signature associated with the first image has the threshold level of similarity to the location signature associated with the second image and (ii) the determination that the construction-related activity at the target location has progressed the threshold amount, send a communication automatically authorizing payment for the construction related activity. In another example, back-end computing platform 102 may in response to (i) the determination that the location signature associated with the first image has the threshold level of similarity to the location signature associated with the second image and (ii) the determination that the construction-related activity at the target location has progressed the threshold amount, send a communication that takes the form of a bill for the construction related activity (e.g., send a bill to a general contractor). Other examples are possible as well.

ii. Determination of Error(s) in Determined Location Signature(s)

Figure 9:
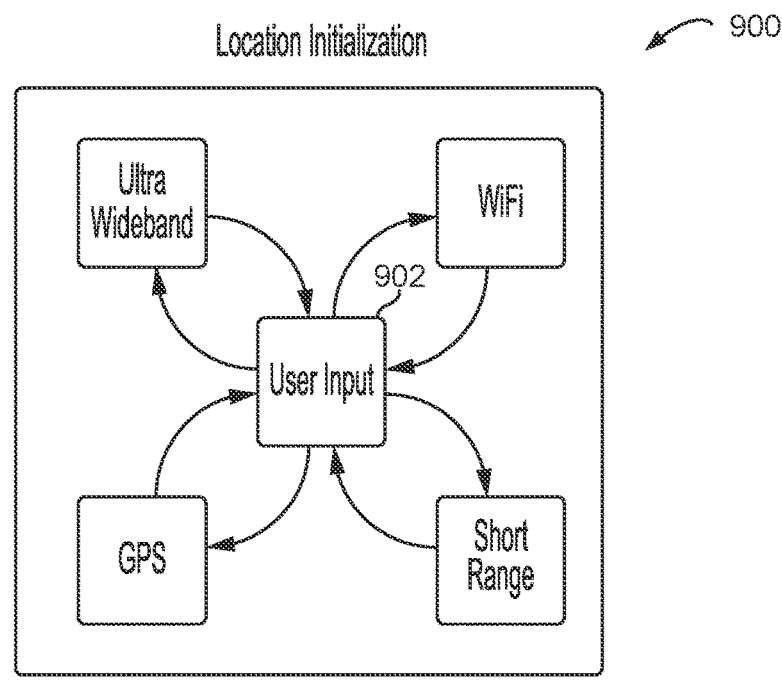
FIG. 9 depicts a conceptual illustration of an example process for retraining a localization-initialization machine learning model according to the disclosed technology.
Figure 10:
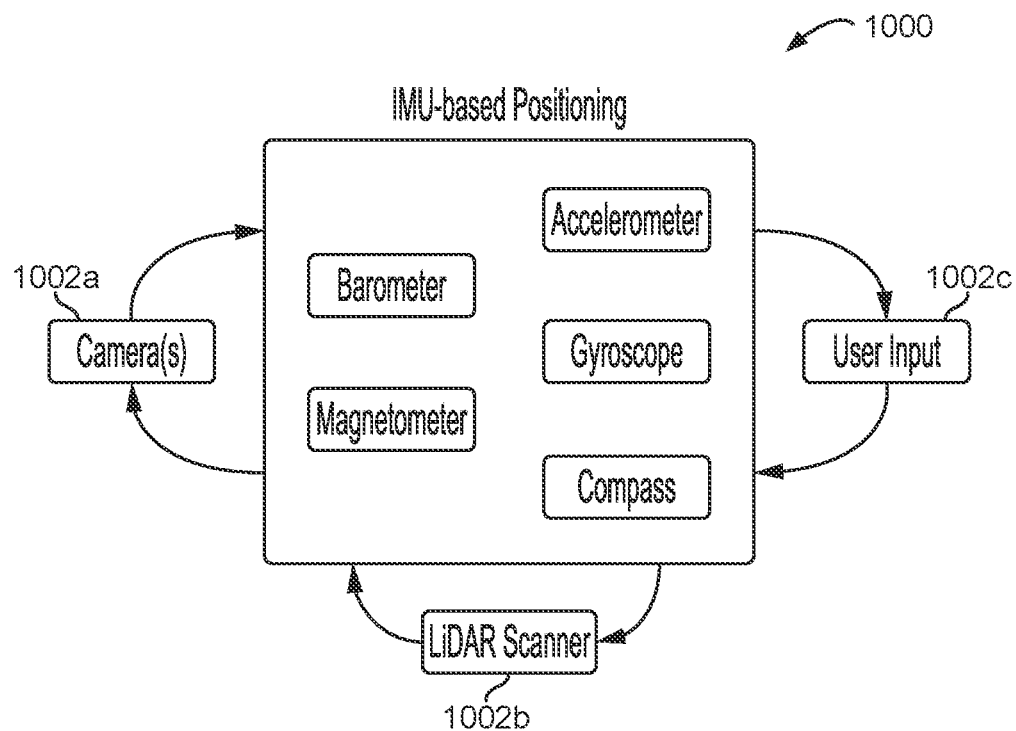
FIG. 10 depicts a conceptual illustration of an example process for retraining an IMU-based positioning machine learning model according to the disclosed technology.
Figure 11:
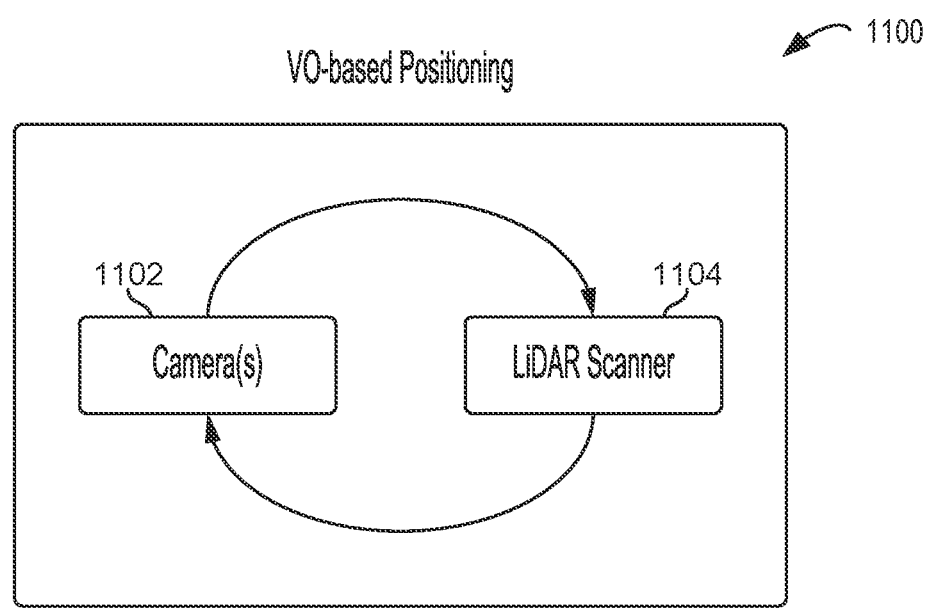
FIG. 11 depicts a conceptual illustration of an example process for retraining a VO-based positioning machine learning model according to the disclosed technology.

In some examples, back-end computing platform 102 may determine errors in determined location signatures and/or errors in determined location estimates upon which the location signatures are based, and back-end computing platform 102 may use those determined errors in order to improve accuracy of future location-signature determinations. For instance, back-end computing platform 102 may determine one or more errors in the estimations output by the one or more machine learning models and retrain the one or more machine learning models using one or more determined errors in the estimations output by the one or more machine learning models, so as to improve future estimations output by the one or more machine learning models. FIGS. 9-11 depict conceptual illustrations of example processes for retraining the machine learning models discussed above.

FIG. 9 depicts a conceptual illustration of an example process 900 for retraining a localization-initialization machine learning model. As shown in FIG. 9, user input 902 may be used as a source of truth to identify errors and retrain a localization-initialization machine learning model. Using user input 902 as a source of truth may help to revise and adjust estimated location based on an individual location-data sensor (e.g., GPS, UWB, WiFi, or short-range wireless technology) or estimated location based on a fused source (e.g., two or more of the individual location-data sensors). For instance, when a user of the first client station provides user input 902 specifying a current location at which the client station captures the image of the construction-related activity (e.g., user input of a pin drop), back-end computing platform 102 may compare the user-specified location with the estimated location based on an individual location-data or estimated location based on a fused source (i.e., based on two or more of the location sensors). If there are any differences between the user-specified location and the estimated location, back-end computing platform 102 may save the feedback (i.e., the identified differences) and use that feedback to retrain localization-initialization machine learning model. For instance, back-end computing platform 102 may compare an estimated location of the determined location signature to the user-specified location. Further, based on the comparison, back-end computing platform 102 may identify a difference between the estimated location and the user-specified location. In turn, back-end computing platform 102 may use the identified difference as training data to retrain the localization-initialization machine learning model, which in turn may help make the estimated locations output by the localization-initialization machine learning model more accurate. In some cases, such retraining may, for instance, help localization-initialization machine learning model output location estimates within a threshold accuracy level without even taking into account user-specified locations.

The identified differences may take various forms and may also vary based on a variety of factors. As an illustrative example, identified differences may be specific to a model of client station. For instance, analysis of user-specified locations may reveal that data from a given location-data sensor (e.g., a barometer) of a given model of client station may tend to report an elevation having an error of a given amount (e.g., approximately X feet). As another possibility, identified differences may be client-station specific and/or hardware specific. For instance, analysis of user-specified locations may reveal that data from a given phone may tend to have a given bias. As yet another possibility, identified differences may be project specific. For instance, analysis of user-specified locations may reveal that data from a given location-data sensor (e.g., a GPS sensor) from client stations associated with a given construction project may tend to have a latitude bias of a given amount (e.g., approximately X feet). As still yet another possibility, identified differences may be time specific. For instance, analysis of user-specified locations may reveal that data from a given location-data sensor (e.g., a GPS) from client stations received at a given time a day (e.g., morning) may tend to have a latitude bias of a given amount (e.g., approximately X feet). As still yet another possibility, identified differences may be specific to a phase of construction. For instance, in a foundational building phase, there may be more steel beams or other objects and an open line of sight to the sky, which may affect the read of specific sensors. In contrast, when the building is built up, there may be other materials around that person's location that may change the sensor readings. For example, there may be a covered floor, so GPS may no longer be accurate. As another example, if the person at the location is getting enclosed by a steel cage or a concrete mix, the reading of given sensors (e.g., the compass or humidity sensors) could be different. Analysis of user-specified locations may reveal given biases specific to a phase of construction.

FIG. 10 depicts a conceptual illustration of an example process 1000 for retraining an IMU-based positioning machine learning model. In this regard, camera data 1002a, LiDAR scanner data 1002b, and/or user input 1002c may be used as a source of truth that may help machine learning from errors and retrain an IMU-based positioning machine learning model. In an example, the received data related to the first client station comprises user-input location data indicating a user-specified location of the first client station and audio-visual data of the first client station. Further, in such an example, back-end computing platform 102 may evaluate an estimated location of the determined location signature, the user-specified location, and the audio-visual data to determine one or more errors in the determined location signature. Back-end computing platform 102 may then use the determined one or more errors as training data to retrain the IMU-based positioning machine learning model, which in turn may help make the estimated locations output by the IMU-based positioning machine learning model more accurate.

In practice, consumer-level sensors on mobile phones may be error prone and relying only on mathematical models that take into account such error-prone sensor data may result in errors (e.g., corner cases). However, having an accurate source of truth to identify such errors and learn from the errors may be beneficial to make location estimates based on such error-prone sensor data more accurate. Camera data 1002a, LiDAR scanner data 1002b, and/or user input 1002c may serve as a source of truth that can be used to identify errors resulting from error-prone sensor data and learn from the errors from error-prone sensor data.

FIG. 11 depicts a conceptual illustration of an example process 1100 for retraining a VO-based positioning machine learning model. While in a primary implementation VO-based positioning machine learning model may primarily rely on camera data, availability of LiDAR scanners on the latest generation of mobile phones provides an opportunity to use LiDAR scanner data as a source of truth to identify errors and retrain a VO-based positioning machine learning model. In an example, the received data related to the first client station comprises camera data of the first client station and LiDAR scanner data of the first client station. Further, in such an example, back-end computing platform 102 may (i) use the VO-based positioning machine learning model to output a first VO-based positioning location estimate 1102 based on the camera data and (ii) use the VO-based positioning machine learning model to output a second VO-based positioning location estimate 1104 based on the LiDAR scanner data. Back-end computing platform 102 may then compare the first VO-based positioning location estimate to the second VO-based positioning location estimate to identify a difference between the estimates. In turn, back-end computing platform 102 may use the identified difference as training data to retrain the VO-based positioning machine learning model for outputting VO-based positioning location estimates based on camera data.

By continuously comparing location estimate 1102 based on the camera versus location estimate 1104 based on the LiDAR scanner data, back-end computing platform 102 may use identified differences to adjust the future estimation, which may in turn allow future estimates to be based on camera data only (e.g., without taking into account LiDAR scanner data).

The retraining of the machine learning models discussed above may have various benefits. For instance, the retraining may help to improve the accuracy of the output of the machine learning models. As another example, by training and retraining the machine learning models, back-end computing platform 102 may understand errors that may occur when determining location estimates based on data related to the client stations and how to account for those errors. As yet another example, such retraining may help improve processing for client-station-determined location signatures associated with images. As mentioned above, in some examples, the client station may determine a client-station-determined location signature associated with the first image. By identifying those errors and how to account for those errors, client stations may be in turn be configured to perform the processing for determining the location signatures in a manner that accounts for those errors. Other example benefits are possible as well.

iii. Obtaining First Image After Determining Threshold Level of Similarity

In some examples of process 400, the location signature associated with the first image may be determined prior to the first image being captured by the first client station. In such a case, the location signature associated with the first image may be a location signature of the client station. More particularly, in an example, first client station 112 may send back-end computing platform 102 data related to first client station 112, and in turn back-end computing platform 102 may determine a location of first client station 112. Back-end computing platform 102 may treat the determined location of first client station 112 as a location signature of the first client station. In turn, back-end computing platform 102 may determine that the location signature of the client station (which in this example corresponds to the location signature associated with the first image) has the threshold level of similarity to the location signature associated with the second image that is associated with the target location. In response to determining the location signature of the client station has the threshold level of similarity to the location signature associated with the second image that is associated with the target location, back-end platform 102 may send a message to the first client station to cause a camera of the first client station to take the first image.

In practice, this process may allow a user of a client station to travel to a target location and have the client station automatically capture the image of the target location when back-end computing platform 102 determines that client station 112 is in a suitable position. Beneficially, capturing the "after image" after determining that the client station is in a suitable position may help to ensure that the "after image" is taken at an appropriate location. This may help to avoid a situation where a user may take a photograph in a position that is too far removed from the location at which the "before image" was taken, in which case back-end computing platform 102 may determine that the "after image" and the "before image" do not have locations signatures having a threshold level of similarity and may reject the first image as a representation of the progress of a construction-related activity at the location. As a result, in some cases, capturing the "after image" after determining that the client station is in a suitable location may result in fewer images being captured to verify completion of a given construction-related activity at the target location.

iv. Determination of Threshold Level of Similarity to Location Associated with Construction Drawing Related to Construction-Related Activity In the examples discussed above, the location signature of the first image is compared to a location signature associated with a second image (e.g., a "before image") that is associated with the target location, so as to determine whether the location signature associated with the first image has a threshold level of similarity to a location signature associated with the second image that is associated with the target location. Additionally or alternatively, in some examples, the location signature of the first image may be compared to a location associated with a construction drawing related to the construction-related activity at the target location. Constructions drawings may comprise and/or be associated with location information associated with the construction activities depicted in the drawings. For instance, construction drawings may be prepared using a coordinate system that represents a digital representation of the real-world location (e.g., latitude, longitude, elevation) of elements in the construction drawings that are to be constructed. In some examples, the construction drawing may be a two-dimensional construction drawing. In other examples, the construction drawing may be a three-dimensional drawing (e.g., a three-dimensional digital model). Other construction drawings are possible as well.

Figure 12:
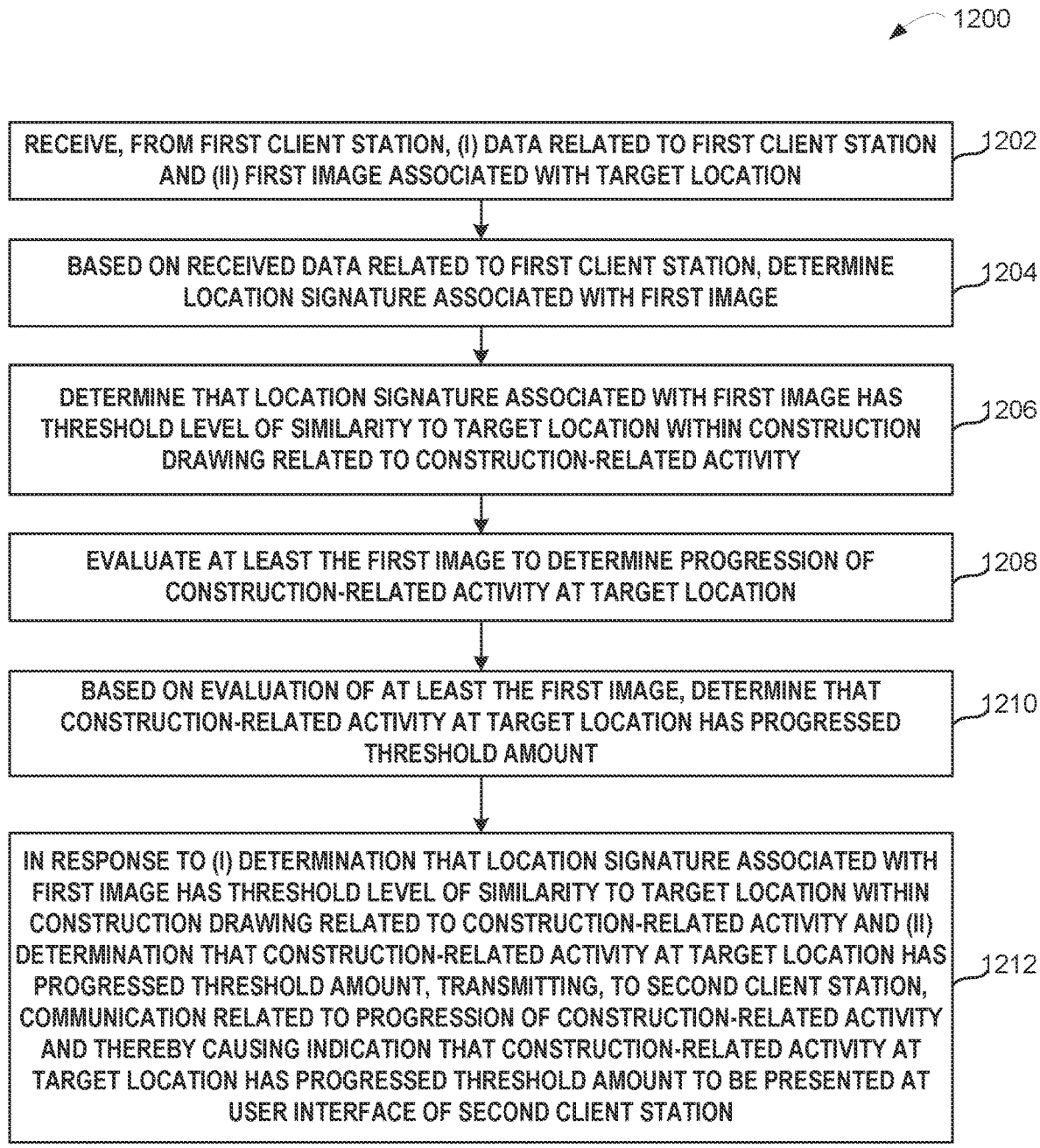
FIG. 12 depicts an example process for verifying progression of construction-related activity at a given location according to the disclosed technology.

In line with the discussion above and with reference to FIG. 12, an example process 1200 that may be carried out in accordance with the disclosed technology in order to facilitate verification of progression of construction-related activity at a given location is shown. For purposes of illustration only, example process 1200 is described as being carried out by back-end computing platform 102 of FIG. 1, but it should be understood that example process 1200 may be carried out by computing platforms that take other forms as well. Further, it should be understood that, in practice, the functions described with reference to FIG. 12 may be encoded in the form of program instructions that are executable by one or more processors of back-end computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

The example process 1200 may begin at block 1202, where back-end computing platform 102 receives, from a first client station, (i) data related to the first client station and (i) a first image associated with a target location. In this respect, block 1202 is similar in many respects to block 402, and thus is not described in as great of detail. It should be understood, however, that many of the possibilities and permutations described with respect to block 402 are also possible with respect to block 1202.

At block 1204, back-end computing platform 102, based on the received data related to the first client station, determines a location signature associated with the first image. In this respect, block 1204 is similar in many respects to block 404, and thus is not described in as great of detail. It should be understood, however, that many of the possibilities and permutations described with respect to block 404 are also possible with respect to block 1204.

At block 1206, back-end computing platform 102 determines that the location signature associated with the first image has a threshold level of similarity to a target location within a construction drawing related to the construction-related activity. For example, a user may select the target location on a visual representation of the construction drawing either before or after capturing the first image. As discussed above, construction drawings may be prepared using a coordinate system that represents a digital representation of the real-world location (e.g., latitude, longitude, elevation) of elements in the construction drawings that are to be constructed, so the selected target location may be associated with a given real-world location (e.g., latitude, longitude, elevation). Otherwise, block 1206 is similar in many respects to block 406, and thus is not described in as great of detail. It should be understood, however, that many of the possibilities and permutations described with respect to block 406 are also possible with respect to block 1206.

At block 1208, back-end computing platform 102 evaluates at least the first image to determine progression of a construction-related activity at the target location. In this respect, block 1208 is similar in many respects to block 408, and thus is not described in as great of detail. It should be understood, however, that many of the possibilities and permutations described with respect to block 408 are also possible with respect to block 1208.

Further, in an example, back-end computing platform 102 may utilize one or more image-recognition operations that serve to identify objects in the first image and determine progression of the construction-related activity based on the identified objects in the first image. For instance, different construction activities may be associated with different objects, and back-end computing platform 102 may analyze the first image to identify objects that are associated with the activity to which the image is associated. Further, a given construction-related activity may be associated with a given number of objects and/or a given size of objects that are expected to be completed (e.g., completed by the completion of the project, or expected to be completed at a given stage of the project), as represented in the construction drawing. Back-end computing platform 102 may analyze the first image to determine whether the first image displays the expected number of objects and/or the expected size of objects. Other examples are possible as well.

At block 1210, back-end computing platform 102, based on the evaluation of at least the first image, determines that the construction-related activity at the target location has progressed a threshold amount. In this respect, block 1210 is similar in many respects to block 410, and thus is not described in as great of detail. It should be understood, however, that many of the possibilities and permutations described with respect to block 410 are also possible with respect to block 1210. Further, in line with the discussion above, in an example, back-end computing platform 102 may determine that the construction-related activity at the target location has progressed a threshold amount in response to determining that the first image displays the expected number of objects and/or the expected size of objects.

At block 1212, back-end computing platform 102, in response to (i) the determination that the location signature associated with the first image has the threshold level of similarity to a target location within a construction drawing related to the construction-related activity and (ii) the determination that the construction-related activity at the target location has progressed the threshold amount, transmits, to a second client station, a communication related to progression of the construction-related activity and thereby causes an indication that the construction-related activity at the target location has progressed the threshold amount to be presented at a user interface of the second client station. In this respect, block 1212 is similar in many respects to block 412, and thus is not described in as great of detail. It should be understood, however, that many of the possibilities and permutations described with respect to block 412 are also possible with respect to block 1212.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed operations for verifying progression of an activity at a given location may not be limited to only construction projects. Rather, the disclosed operations could be used in other contexts in connection with other types of projects as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
a communication interface;
at least one processor;
at least one non-transitory computer-readable medium; and
program instructions stored on the at least one non-transitory computer-readable medium that are executable by the at least one processor to cause the computing platform to:
receive, from a first client station, (i) data related to the first client station and (ii) a first image associated with a target location, wherein the data related to the first client station comprises audio-visual data of the first client station comprising camera data of the first client station and light detection and ranging (Li-DAR) scanner data of the first client station;
use a Visual Odometry based (VO-based) positioning machine learning model to output a VO-based positioning location estimate based on at least a portion of the audio-visual data;

based at least on the VO-based positioning location estimate, determine a location signature associated with the first image;

determine that the location signature associated with the first image has a threshold level of similarity to a location signature associated with a second image that is associated with the target location;

evaluate at least the first image to determine progression of a construction-related activity at the target location;

based on the evaluation of at least the first image, determine that the construction-related activity at the target location has progressed a threshold amount;

in response to (i) the determination that the location signature associated with the first image has the threshold level of similarity to the location signature associated with the second image and (ii) the determination that the construction-related activity at the target location has progressed the threshold amount, transmit, to a second client station, a communication related to progression of the construction-related activity and thereby cause an indication that the construction-related activity at the target location has progressed the threshold amount to be presented at a user interface of the second client station;

use the VO-based positioning machine learning model to output a first VO-based positioning location estimate based on the camera data;

use the VO-based positioning machine learning model to output a second VO-based positioning location estimate based on the LiDAR scanner data;

compare the first VO-based positioning location estimate to the second VO-based positioning location estimate to identify a difference between the estimates; and use the identified difference as training data to retrain the VO-based positioning machine learning model for outputting VO-based positioning location estimates based on camera data.

2. The computing platform of claim 1, wherein the data related to the first client station further comprises one or more of location data of the first client station and sensor data of the first client station.

3. The computing platform of claim 2, further comprising program instructions stored on the at least one non-transitory computer-readable medium that are executable by the at least one processor to cause the computing platform to:

one or more of (i) use a localization-initialization machine learning model to output a location-initialization location estimate based on the location data and (ii) use an Inertial Measurement Unit based (IMU-based) positioning machine learning model to output an IMU-based positioning location estimate based on the sensor data, wherein the program instructions stored on the at least one non-transitory computer-readable medium that are executable by the at least one processor to cause the computing platform to, based at least on the VO-based positioning location estimate, determine the location signature associated with the first image comprise program instructions stored on the at least one non-transitory computer-readable medium that are executable by the at least one processor to cause the computing platform to:

determine the location signature associated with the first image based on (i) the VO-based positioning location estimate and (ii) one or more of the location-initialization location estimate and the IMU-based positioning location estimate.

4. The computing platform of claim 3, wherein the received data related to the first client station further comprises user-input location data indicating a user-specified location of the first client station, and wherein the computing platform further comprises program instructions stored on the at least one non-transitory computer-readable medium that are executable by the at least one processor to cause the computing platform to:

compare an estimated location of the determined location signature to the user-specified location;

based on the comparison, identify a difference between the estimated location and the user-specified location; and use the identified difference as training data to retrain the localization-initialization machine learning model.

5. The computing platform of claim 3, wherein the received data related to the first client station further comprises user-input location data indicating a user-specified location of the first client station and wherein the computing platform further comprises program instructions stored on the at least one non-transitory computer-readable medium that are executable by the at least one processor to cause the computing platform to:

evaluate an estimated location of the determined location signature, the user-specified location, and the audio-visual data to determine one or more errors in the determined location signature; and use the determined one or more errors as training data to retrain the IMU-based positioning machine learning model.

6. The computing platform of claim 1, wherein the first client station generates the location signature associated with the first image, and wherein the data related to the first client station comprises the location signature associated with the first image that is generated by the first client station.

7. The computing platform of claim 1, further comprising program instructions stored on the at least one non-transitory computer-readable medium that are executable by the at least one processor to cause the computing platform to:

receive, from a third client station, (i) data related to the third client station and (ii) the second image; and based on the received data related to the third client station, determine the location signature associated with the second image.

8. The computing platform of claim 1, wherein the first image is captured at a first time and the second image is captured at a second time, and wherein the second time is prior to the first time.

9. The computing platform of claim 1, wherein the location signature comprises data related to a plurality of fields, the plurality of fields comprising two or more fields from a time field, a time-zone field, a longitude field, a latitude field, an elevation field, a floor field, a floorplan-identification field, an orientation field, a direction field, a visual-features field, and a depth-features field.

10. The computing platform of claim 1, wherein the program instructions stored on the at least one non-transitory computer-readable medium that are executable by the at least one processor to cause the computing platform to evaluate at least the first image to determine progression of a construction-related activity at the target location comprise program instructions stored on the at least one non-transitory computer-readable medium that are executable by the at least one processor to cause the computing platform to:

evaluate the first image and the second image to determine progression of a construction-related activity at the target location.

11. The computing platform of claim 1, wherein the threshold amount comprises a predefined percentage of completion of the construction-related activity at the target location.

12. The computing platform of claim 1, further comprising program instructions stored on the at least one non-transitory computer-readable medium that are executable by the at least one processor to cause the computing platform to:
in response to determining the location signature associated with the first image has the threshold level of similarity to the location signature associated with the second image that is associated with the target location, send a message to the first client station to cause a camera of the first client station to take the first image.

13. A non-transitory computer-readable medium, wherein the non-transitory computer-readable medium is provisioned with program instructions that, when executed by at least one processor, cause a computing platform to:
receive, from a first client station, (i) data related to the first client station and (ii) a first image associated with a target location, wherein the data related to the first client station comprises audio-visual data of the first client station comprising camera data of the first client station and light detection and ranging (LiDAR) scanner data of the first client station;
use a Visual Odometry based (VO-based) positioning machine learning model to output a VO-based positioning location estimate based on at least a portion of the audio-visual data;
based at least on the VO-based positioning location estimate, determine a location signature associated with the first image;
determine that the location signature associated with the first image has a threshold level of similarity to a location signature associated with a second image that is associated with the target location;
evaluate at least the first image to determine progression of a construction-related activity at the target location;
based on the evaluation of at least the first image, determine that the construction-related activity at the target location has progressed a threshold amount;
in response to (i) the determination that the location signature associated with the first image has the threshold level of similarity to the location signature associated with the second image and (ii) the determination that the construction-related activity at the target location has progressed the threshold amount, transmit, to a second client station, a communication related to progression of the construction-related activity and thereby cause an indication that the construction-related activity at the target location has progressed the threshold amount to be presented at a user interface of the second client station;
use the VO-based positioning machine learning model to output a first VO-based positioning location estimate based on the camera data;
use the VO-based positioning machine learning model to output a second VO-based positioning location estimate based on the LiDAR scanner data;
compare the first VO-based positioning location estimate to the second VO-based positioning location estimate to identify a difference between the estimates; and
use the identified difference as training data to retrain the VO-based positioning machine learning model for outputting VO-based positioning location estimates based on camera data.

14. The non-transitory computer-readable medium of claim 13, wherein the data related to the first client station further comprises one or more of location data of the first client station and sensor data of the first client station.

15. The non-transitory computer-readable medium of claim 13, wherein the non-transitory computer-readable medium is also provisioned with program instructions that, when executed by at least one processor, cause the computing platform to:
one or more of (i) use a localization-initialization machine learning model to output a location-initialization location estimate based on the location data and (ii) use an Inertial Measurement Unit based (IMU-based) positioning machine learning model to output an IMU-based positioning location estimate based on the sensor data,
wherein the program instructions that, when executed by the at least one processor, cause the computing platform to, based at least on the VO-based positioning location estimate, determine the location signature associated with the first image comprise program instructions that, when executed by the at least one processor, cause the computing platform to:
determine the location signature associated with the first image based on (i) the VO-based positioning location estimate and (ii) one or more of the location-initialization location estimate and the IMU-based positioning location estimate.

16. The non-transitory computer-readable medium of claim 13, wherein the non-transitory computer-readable medium is also provisioned with program instructions that, when executed by at least one processor, cause the computing platform to:
in response to determining the location signature associated with the first image has the threshold level of similarity to the location signature associated with the second image that is associated with the target location, send a message to the first client station to cause a camera of the first client station to take the first image.

17. A method carried out by a computing platform, the method comprising:
receiving, from a first client station, (i) data related to the first client station and (ii) a first image associated with a target location, wherein the data related to the first client station comprises audio-visual data of the first client station comprising camera data of the first client station and light detection and ranging (LiDAR) scanner data of the first client station;
using a Visual Odometry based (VO-based) positioning machine learning model to output a VO-based positioning location estimate based on at least a portion of the audio-visual data;
based at least on the VO-based positioning location estimate, determining a location signature associated with the first image;
determining that the location signature associated with the first image has a threshold level of similarity to a location signature associated with a second image that is associated with the target location;
evaluating at least the first image to determine progression of a construction-related activity at the target location;

based on the evaluation of at least the first image, determining that the construction-related activity at the target location has progressed a threshold amount;

in response to (i) the determination that the location signature associated with the first image has the threshold level of similarity to the location signature associated with the second image and (ii) the determination that the construction-related activity at the target location has progressed the threshold amount, transmitting, to a second client station, a communication related to progression of the construction-related activity and thereby causing an indication that the construction-related activity at the target location has progressed the threshold amount to be presented at a user interface of the second client station;

using the VO-based positioning machine learning model to output a first VO-based positioning location estimate based on the camera data;

using the VO-based positioning machine learning model to output a second VO-based positioning location estimate based on the LiDAR scanner data;

comparing the first VO-based positioning location estimate to the second VO-based positioning location estimate to identify a difference between the estimates; and using the identified difference as training data to retrain the VO-based positioning machine learning model for outputting VO-based positioning location estimates based on camera data.

18. The method of claim 17, wherein the data related to the first client station further comprises one or more of location data of the first client station and sensor data of the first client station.

19. The method of claim 17, further comprising:

one or more of (i) using a localization-initialization machine learning model to output a location-initialization location estimate based on the location data and (ii) using an Inertial Measurement Unit based (IMU-based) positioning machine learning model to output an IMU-based positioning location estimate based on the sensor data, wherein, based at least on the VO-based positioning location estimate, determining the location signature associated with the first image comprises determining the location signature associated with the first image based on (i) the VO-based positioning location estimate and (ii) one or more of the location-initialization location estimate and the IMU-based positioning location estimate.

\* \* \* \* \*